US012377573B2

(12) United States Patent
Niiyama

(10) Patent No.: US 12,377,573 B2
(45) Date of Patent: Aug. 5, 2025

(54) CUTTER MACHINE

(71) Applicant: MAKITA CORPORATION, Anjo (JP)

(72) Inventor: Takuma Niiyama, Anjo (JP)

(73) Assignee: MAKITA CORPORATION, Anjo (JP)

( * ) Notice: Subject to any disclaimer, the term of this patent is extended or adjusted under 35 U.S.C. 154(b) by 175 days.

(21) Appl. No.: 18/328,067

(22) Filed: Jun. 2, 2023

(65) Prior Publication Data

US 2023/0405865 A1 Dec. 21, 2023

(30) Foreign Application Priority Data

Jun. 16, 2022 (JP) ................................ 2022-097394

(51) Int. Cl.
*B27G 19/00* (2006.01)

(52) U.S. Cl.
CPC .................................. *B27G 19/003* (2013.01)

(58) Field of Classification Search
CPC .............................. B27G 19/003; B27B 17/02
See application file for complete search history.

(56) References Cited

U.S. PATENT DOCUMENTS 4,658,507 A * 4/1987 Hazen ................ B27B 17/0008 30/295
4,841,641 A * 6/1989 Laidlaw ............... B27G 19/003 30/382
4,885,818 A * 12/1989 Arterbury .............. B25G 1/102 16/430
5,016,355 A * 5/1991 Gassen ............... B27B 17/0033 173/162.1
5,078,119 A * 1/1992 Holmes .................. B27B 17/14 125/21
5,535,521 A * 7/1996 Alcorn ................. B27G 19/003 30/286
6,820,340 B1 * 11/2004 Martin .................... B27B 21/02 30/166.3
8,763,260 B2 * 7/2014 Ranieri .................. B23D 51/03 30/512
11,794,371 B1 * 10/2023 Hu .......................... B27B 17/02
2007/0050993 A1 * 3/2007 Phillips .................. B23D 51/01 30/392
2013/0305545 A1 * 11/2013 Schell .................. B27G 19/003 30/286
2023/0087479 A1 * 3/2023 Liu, Jr. .................... H02K 9/06 30/382
2023/0321738 A1 * 10/2023 Li ........................ B27G 19/003 83/78
2023/0330888 A1 * 10/2023 Greene ................ B27G 19/003
2024/0058982 A1 * 2/2024 Li ........................... B27B 17/02

FOREIGN PATENT DOCUMENTS

JP 2019-209581 A 12/2019

* cited by examiner

*Primary Examiner* — Omar Flores Sanchez
(74) *Attorney, Agent, or Firm* — Sughrue Mion, PLLC

(57) ABSTRACT

A cutter machine may include a cutter unit, a prime mover configured to drive the cutter unit, a housing including a housing body and a grip, wherein the housing body holds the cutter unit and houses the prime mover, and the grip extends from the housing body and is configured to be grasped by a user's hand, and a hand guard attached to the housing, configured to protect fingers of the user's hand grasping the grip, and being more deformable than the housing.

9 Claims, 15 Drawing Sheets

CUTTER MACHINE

REFERENCE TO RELATED APPLICATIONS

This application claims priority from Japanese Patent Application No. 2022-97394 filed on Jun. 16, 2022. The entire content of the priority application is incorporated herein by reference.

TECHNICAL FIELD

The art disclosed herein relates to cutter machines.

BACKGROUND ART

Japanese Patent Application Publication No. 2019-209581 describes a cutter machine including: a cutter unit; a prime mover configured to drive the cutter unit; a housing including a housing body and a grip, wherein the housing body holds the cutter unit and houses the prime mover, and the grip extends from the housing body and is configured to be grasped by a user's hand; and a finger guard attached to the housing and configured to protect fingers of the user's hand grasping the grip. The finger guard is integrated seamlessly with the housing. Due to this, the finger guard deforms at about the same level as the housing.

DESCRIPTION

In the cutter machine of JP 2019-209581 A, the finger guard (corresponding to hand guard in the present application) is arranged to protect the fingers of the user's hand grasping the grip. However, in the cutter machine, user convenience could be decreased by the presence of the hand guard. For example, when the user is to perform cutting work using the cutter machine (such as pruning tree branches), the hand guard could mechanically interfere with an obstacle (such as a tree branch), as a result of which the cutter machine may not be used in the desired position or posture and thus the cutting work may be hindered. The description herein provides an art configured to improve user convenience of a cutter machine with a hand guard.

A cutter machine disclosed herein may comprise a cutter unit, a prime mover configured to drive the cutter unit, a housing including a housing body and a grip, wherein the housing body holds the cutter unit and houses the prime mover, and the grip extends from the housing body and is configured to be grasped by a user's hand, and a hand guard attached to the housing, configured to protect fingers of the user's hand grasping the grip, and being more deformable than the housing.

"Deformability of the hand guard" herein refers to reversible deformation. For example, "the hand guard being deformable" may mean elastic deformation of the hand guard itself. Further, "the hand guard being deformable" may mean that a hand guard arranged for example on a so-called swing door deforms from a closed state to an open state by being swung. Further, the "the hand guard being deformable" may mean a change in position of the hand guard with respect to the housing, where the hand guard is configured capable of sliding between a first position and a second position with respect to the housing.

According to the above configuration, when a load is applied to the hand guard in a state where the hand guard is in contact with an obstacle, the hand guard deforms relative to the housing. Due to this, when the user is to perform the cutting work using the cutter machine, the cutter machine can be used in its desired position or posture even if the hand guard interferes with an obstacle. Thus, user convenience can be improved in the cutter machine with the hand guard.

Figure 1:
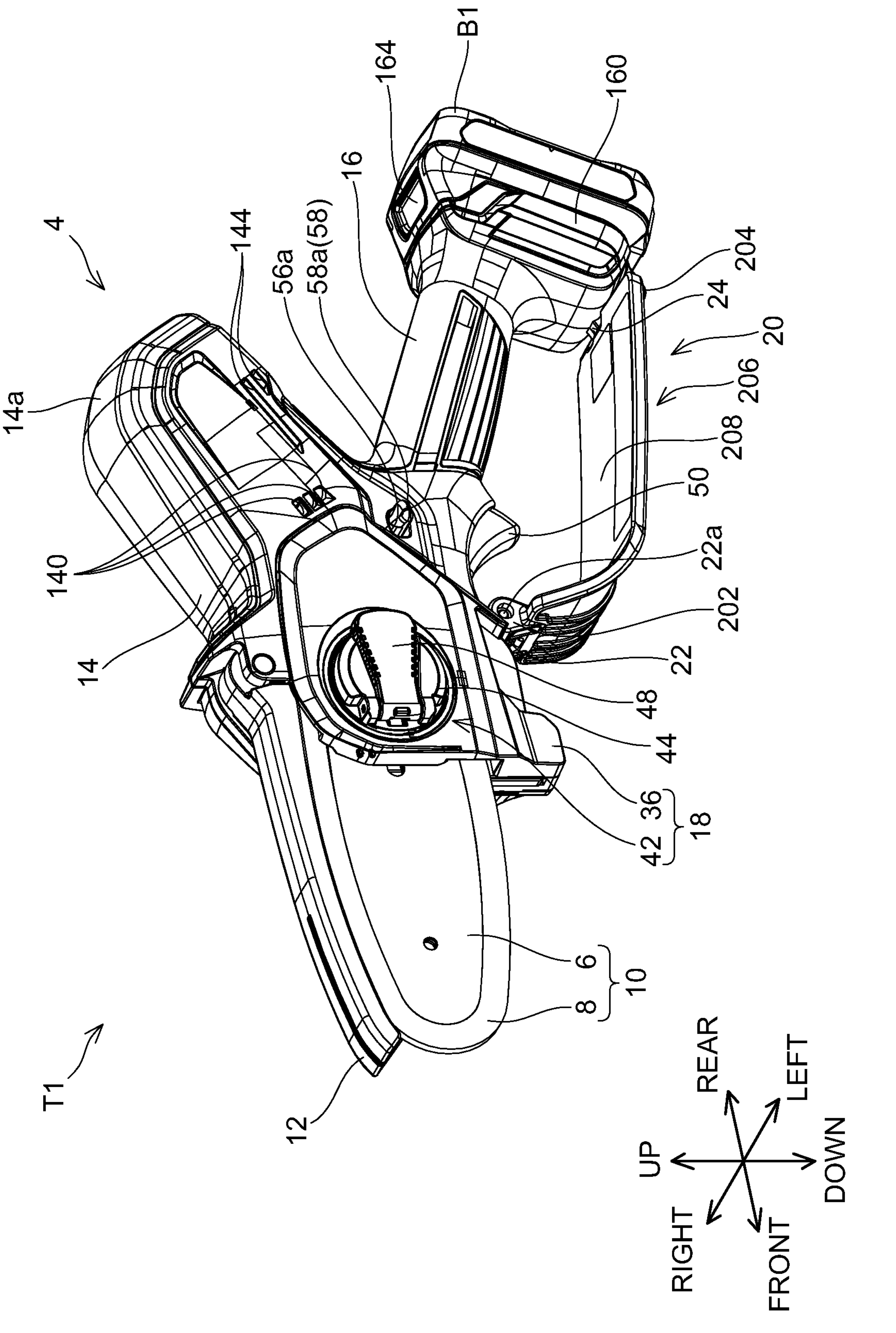
FIG. 1 is a perspective view seeing a chainsaw T1 of a first embodiment from front left upper side.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved cutter machines as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, the housing may be constituted of a material with a Young's modulus greater than 100 MPa. The hand guard may be constituted of a material with a Young's modulus within a range from 1 MPa to 100 MPa.

When the hand guard is to be deformed by elastic deformation, a load required to deform the hand guard by a predetermined amount becomes larger when the Young's modulus of the material constituting the hand guard becomes greater. According to the above configuration, a user can sufficiently deform the hand guard with a relatively small load. Due to this, user convenience can further be improved.

In one or more embodiments, the housing may be constituted of plastic. The hand guard may be constituted of rubber.

Rubber can be elastically deformed at a greater degree as compared to other materials (such as plastic). According to the above configuration, the user can elastically deform the hand guard at a greater degree. Due to this, the user convenience can further be improved.

In one or more embodiments, the hand guard may comprise a first end disposed at or in proximity to a base end of the grip, a second end disposed at or in proximity to a distal end of the grip, and a guard body extending continuously between the first end and the second end.

In the description herein, an end of the grip closer to the housing body will be termed the "base end of the grip" and an end of the grip on a farther side from the housing body will be termed the "distal end of the grip".

According to the above configuration, the hand guard is disposed to cover the grip from its base end to the distal end. Due to this, the fingers of the user's hand grasping the grip can surely be protected.

In one or more embodiments, the housing may comprise a first attachment portion to which the first end of the hand guard is attached, and a second attachment portion to which the second end of the hand guard is attached. At least one of the first end and the second end may be rotatably attached to corresponding one of the first attachment portion and the second attachment portion.

When the hand guard is supported at two points, namely at its first and second ends, there may be cases where each of the first and second ends is fixed to its corresponding one of the first and second attachment portions. In this case, the hand guard can be regarded as being a fixed beam, thus the load required for deforming the hand guard (guard body) by a predetermined amount becomes larger. Contrary to this, according to the above configuration, at least one of the first and second ends is attached by being rotatable to its corresponding one of the first and second attachment portions. In this case, the hand guard can be regarded as being a supported cantilever or a simply supported beam (pin-supported), thus the user can sufficiently deform the hand guard with a relatively small load.

In one or more embodiments, the guard body may comprise a plate portion having a plate shape.

According to the above configuration, by configuring the plate portion to be in the plate shape that spreads with a small thickness, the plate portion can easily be deformed elastically and the fingers of the user's hand can be protected by the plate portion over a wide range. Due to this, a hand guard that can easily deform while ensuring the protecting function as the hand guard can be realized.

In one or more embodiments, the guard body may comprise a rib portion protruding from a surface of the plate portion and extending in a direction from the first end toward the second end, at a part where the guard body is opposed to the grip.

When the plate portion deforms excessively (a warping amount of the plate portion becoming excessively large) at the part opposed to the grip, an interval between the grip and the plate portion becomes extremely narrow, and the plate portion might be pressed against the fingers of the user's hand grasping the grip. In this case, the user cannot easily change postures of the fingers, thus the user convenience is decreased. According to the above configuration, rigidity of the plate portion at the part opposed to the grip is reinforced by the rib portion. Due to this, the plate portion can be suppressed from deforming excessively (the warping amount of the plate portion becoming excessively large) at the part opposed to the grip. Due to this, the plate portion can be suppressed from being pressed against the fingers of the user's hand grasping the grip. Thus, the user convenience can be improved.

In one or more embodiments, the rib portion may protrude from a surface of the plate portion that is opposite a surface of the plate portion facing the grip.

When the rib portion protrudes from the surface of the plate portion facing the grip, there is a risk that the rib portion comes into contact with the fingers of the user's hand upon when the user inserts the fingers between the grip and the plate portion or takes them out. In such a case, the user may feel bothered by the contact, and the user convenience may thereby be decreased. Contrary to this, according to the above configuration, the rib portion protrudes out from the surface of the plate portion that is on the opposite side from the surface facing the grip. Due to this, the rib portion can be suppressed from coming into contact with the fingers of the user's hand when the user inserts the fingers between the grip and the plate portion or takes them out. Thus, the user convenience can be improved.

In one or more embodiments, the cutter machine may further comprise a trigger lever disposed at in proximity to the base end of the grip and configured to operate the prime mover by being pulled toward the grip by a user's finger. The guard body may comprise a first extending portion connected to the first end and extending to separate away from the grip as it extends from the base end toward the distal end, a second extending portion connected to the second end and extending to separate away from the grip as it extends from the distal end toward the base end, and a bending portion connecting the first extending portion and the second extending portion. A length of the first extending portion may be shorter than a length of the second extending portion.

If the guard body is pressed against the finger(s) of the user's hand that are placed on the trigger lever upon when the guard body deforms, the trigger lever could be operated erroneously. Contrary to this, according to the above configuration, the guard body has reinforced rigidity at and around the bending portion. Further, the bending portion has a shape protruding outward as seen from the grip. Due to this, when the guard body is pressed against the grip, a space is secured between the grip and the guard body by the bending portion. Further, since the bending portion is disposed closer to the base end of the grip, a space is secured in the surrounding of the trigger lever upon when the guard body is pressed against the grip. As such, according to the above configuration, the guard body can be suppressed from being pressed against the finger(s) of the user's hand that are placed on the trigger lever, and erroneous operation on the trigger lever can be suppressed.

FIRST EMBODIMENT

As shown in FIG. 1, a cutter machine of the present embodiment is a chainsaw T1. The chainsaw T1 is a so-called pruning chainsaw that is primarily used for cutting wood materials and tree branches. An entire weight of the chainsaw T1 is relatively light, as it is about 2000 grams at maximum. Due to this, the chainsaw T1 can be carried by one hand.

The chainsaw T1 comprises a housing 4, a guide bar 6, a saw chain 8, a hand guard and a battery pack B1. The guide bar 6 is a long and narrow plate-shaped member attached to the housing 4 so as to protrude frontward from the housing 4. The guide bar 6 is constituted of metal such as iron. The saw chain 8 includes a plurality of cutters coupled to each other (not shown) and is attached along a periphery of the guide bar 6. The battery pack B1, which is substantially rectangular box shaped, is attached to the housing 4. The chainsaw T1 is configured to run the saw chain 8 along the periphery of the guide bar 6 using electric power supplied from the battery pack B1.

Various types of guide bars may be used as the guide bar 6 depending on the content of cutting work. A curvature radius of a distal end of the guide bar 6 is for example 15 mm. The chainsaw T1 of the present embodiment is configured to run the saw chain 8 along the periphery of the guide bar 6 at a speed of 8 m/s, for example. In the description herein, the guide bar 6 and the saw chain 8 may collectively be termed "working unit 10". In the present embodiment, weight of the working unit 10 is for example about 180 grams. Further, a work cover 12 that covers a part of the working unit 10 is disposed on the housing 4. Due to this, the user performs cutting work by bringing the portion of the working unit 10 that is not covered by the work cover 12 into contact with an object to be cut (such as a tree branch). In doing so, a load which the user applies to the chainsaw T1 is expected as being about 20 N at most.

In the following description, a direction along a longitudinal direction of the guide bar 6 directed toward the guide bar 6 from the housing 4 will be termed a frontward direction, and a direction along the longitudinal direction of the guide bar 6 directed toward the housing 4 from the guide bar 6 will be termed a rearward direction. Further, a direction perpendicular to a front-back direction and directed toward the work cover 12 from the working unit 10 will be termed an upward direction, and a direction perpendicular to the front-back direction and directed toward the working unit 10 from the work cover 12 will be termed a downward direction. Further, a direction perpendicular to the front-back direction and an up-down direction will be termed a left-right direction. In FIGS. 1 to 15, for simplification, the saw chain 8 is depicted as an annular member flush with the guide bar 6.

The housing 4 comprises a housing body 14, a grip 16, a first attachment portion 22, and a second attachment portion 24. The housing body 14 has a substantially rectangular box shape inclined upward from its front portion toward its back portion along the front-back direction. The housing body 14 holds the working unit 10 together with a sprocket cover 18 at its front portion. The grip 16 is connected to a front lower portion of the housing body 14. The grip 16 has a substantially cylindrical shape inclined downward from its front portion toward its back portion along the front-back direction. The first attachment portion 22 is arranged to protrude downward from the housing 4 and is disposed in proximity to a base end of the grip 16. The second attachment portion 24 is arranged to protrude downward from the housing 4 and is disposed in proximity to a distal end of the grip 16. A hand guard 20 is attached to the first attachment portion 22 and the second attachment portion 24. The housing 4 (the housing body 14, the grip 16, the first attachment portion 22, and the second attachment portion 24) uses a material with Young's modulus greater than 100 MPa. The housing 4 of the present embodiment uses plastic such as polyamide. Young's modulus of polyamide is, although it is subject to change by its surrounding environment, at least greater than 5000 MPa. A portion where the fingers of the user's hand are to be placed (a top portion 14*a* of the housing body 14, the grip 16, and the surrounding thereof) is coated with rubber such as nitrile butadiene rubber.

Figure 3:
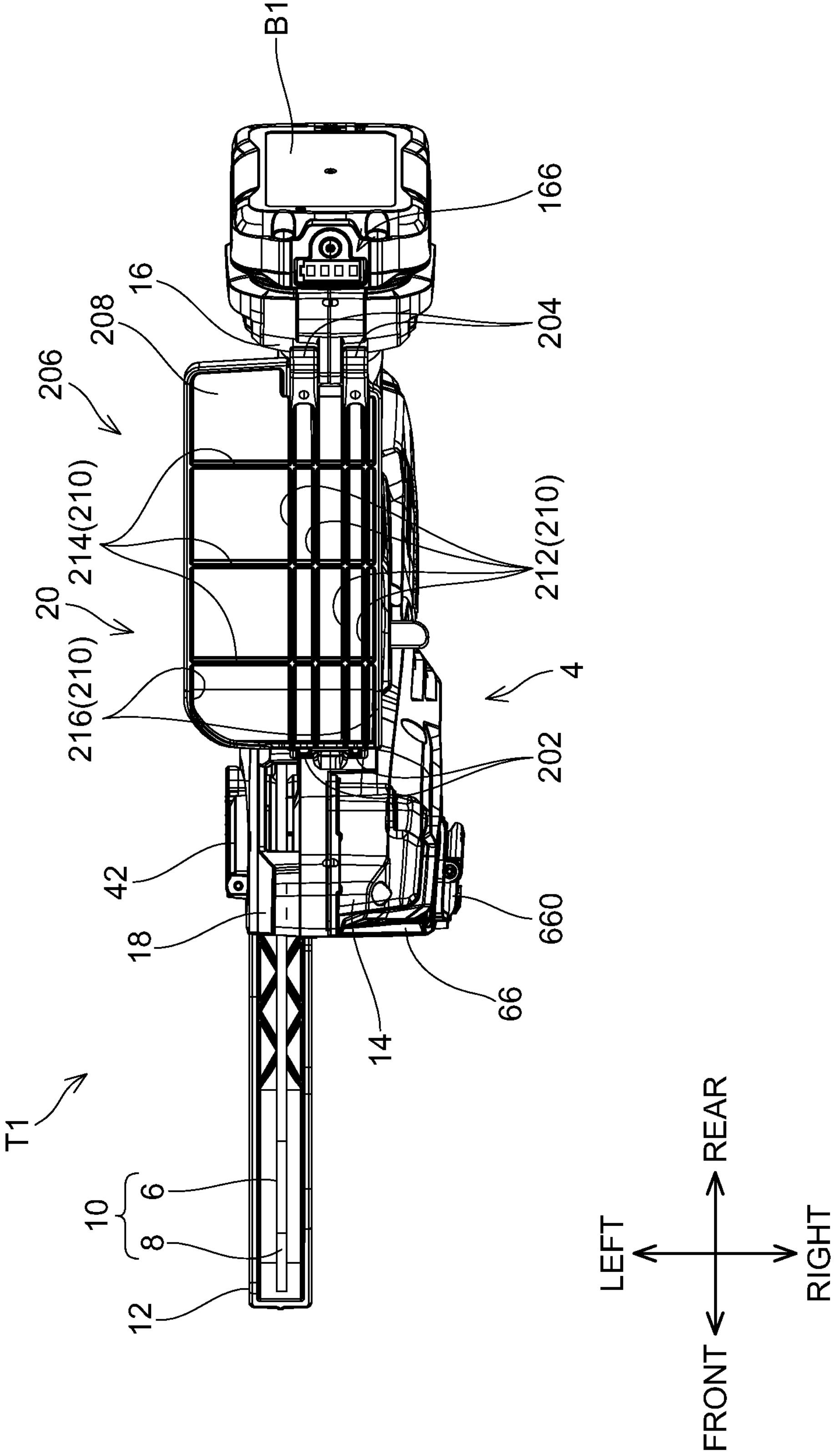
FIG. 3 is a bottom view of the chainsaw T1 of the first embodiment seen from below.

The battery pack B1 houses a rechargeable secondary battery such as a lithium ion battery. An output voltage of the battery pack B1 may for example be 10V. A battery capacity of the battery pack B1 may for example be 1.5 Ah. Weight of the battery pack B1 may for example be about 215 grams. As shown in FIG. 3, an indicator 166 is arranged on a lower surface of the battery pack B1. The indicator 166 notifies the user of remaining charge in the battery pack B1 by changing its display according to the remaining charge of the battery pack B1.

Figure 2:
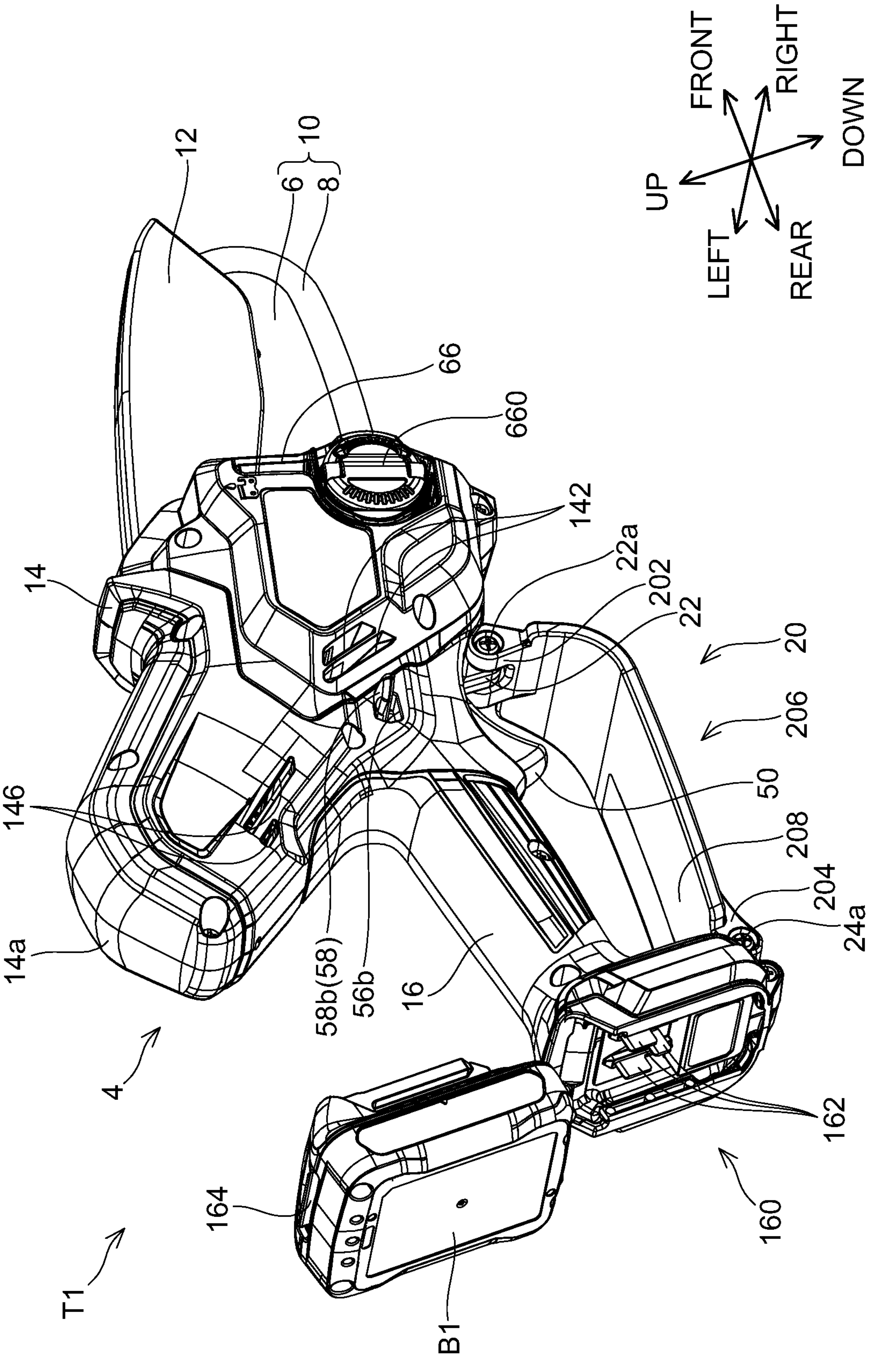
FIG. 2 is a perspective view seeing the chainsaw T1 of the first embodiment from rear right upper side in a state of having a battery pack B1 detached from a battery interface 160.

As shown in FIG. 2, the battery interface 160 for detachably receiving the battery pack B1 is arranged at the distal end of the grip 16. The battery pack B1 is attached by sliding it with respect to the battery interface 160 toward front lower side from rear upper side. Further, the battery interface 160 includes a connection terminal 162 for connecting with a terminal (not shown) of the battery pack B1. The connection terminal 162 is electrically connected with a control unit 62 (see FIG. 6) and a trigger switch 52 (see FIG. 6) to be described later. When the battery pack B1 is attached to the battery interface 160, the terminal of the battery pack B1 and the connection terminal 162 are electrically connected. This allows electric power supply from the battery pack B1 to the control unit 62 and the trigger switch 52.

As shown in FIG. 1, when the battery pack B1 is attached to the battery interface 160, outer surfaces of the battery pack B1 and the grip 16 are smoothly connected. Further, the battery pack B1 is detached by sliding it toward the rear upper side from the front lower side with respect to the battery interface 160 with a hook 164 arranged on the battery pack B1 pressed in.

Figure 4:
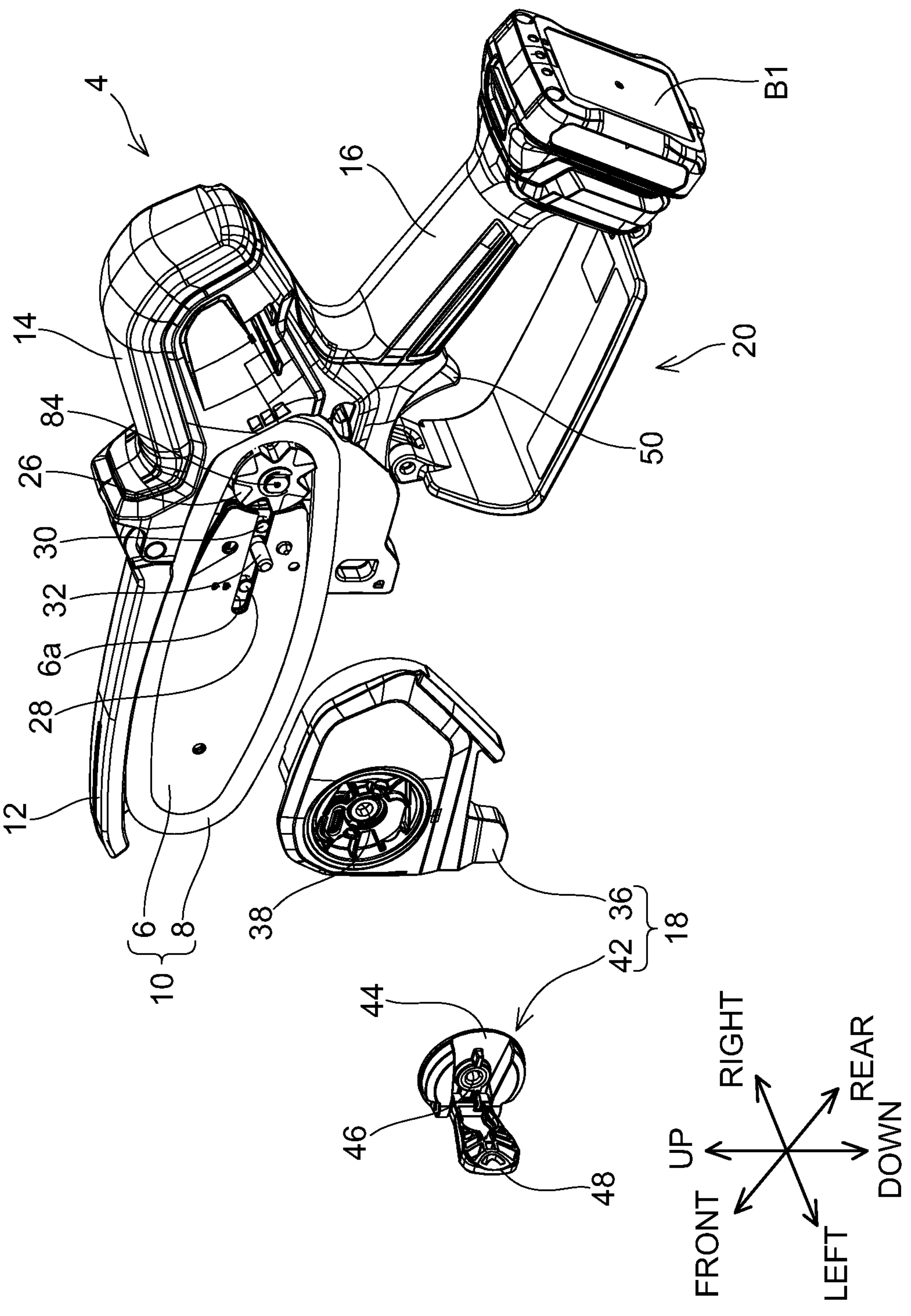
FIG. 4 is a perspective view seeing the chainsaw T1 of the first embodiment from rear left upper side in a state of having a sprocket cover 18 detached from a housing body 14.

As shown in FIG. 4, the sprocket cover 18 includes a sprocket cover body 36 and an engagement member 42. The sprocket cover body 36 includes a sleeve 38. The engagement member 42 includes an engagement member body 44, a nut 46, and a hook portion 48. The sprocket 26 is exposed to outside of the housing body 14 inside the sprocket cover 18. The saw chain 8 is strapped on the sprocket 26 from the guide bar 6. Further, the guide bar 6 has a cutout 6*a* extending along the front-back direction defined therein. The cutout 6*a* has fixed pins 28, 30 protruding from a left side surface of the housing body 14 and a bolt 32 inserted therein from the right.

The sprocket cover 18 can be attached to the housing body 14 by inserting the bolt 32 to the sleeve 38 of the sprocket cover body 36 in the state shown in FIG. 4 and fastening the nut 46 of the engagement member 42 on the bolt 32 penetrating through the sleeve 38. In a state where the nut 46 is fastened to the bolt 32, the guide bar 6 is held and fixed between the housing body 14 and the sprocket cover 18. The user can adjust tension on the saw chain 8 by changing a distance between the guide bar 6 and the sprocket 26 by sliding the guide bar 6 with respect to the housing body 14 in the front-back direction in a state where the bolt 32 and the nut 46 are loosened.

The user can tighten or loosen the bolt 32 and the nut 46 by rotating the hook portion 48 about an axis line of the bolt 32 in a state having the hook portion 48 standing leftward with respect to the engagement member body 44. Due to this, the user can fasten the nut 46 on the bolt 32 with sufficient tightening torque without using a special tool. As shown in FIG. 1, the hook portion 48 under a normal state is held by a torsion spring (not shown) in a state of lying down along the engagement member body 44.

Figure 5:
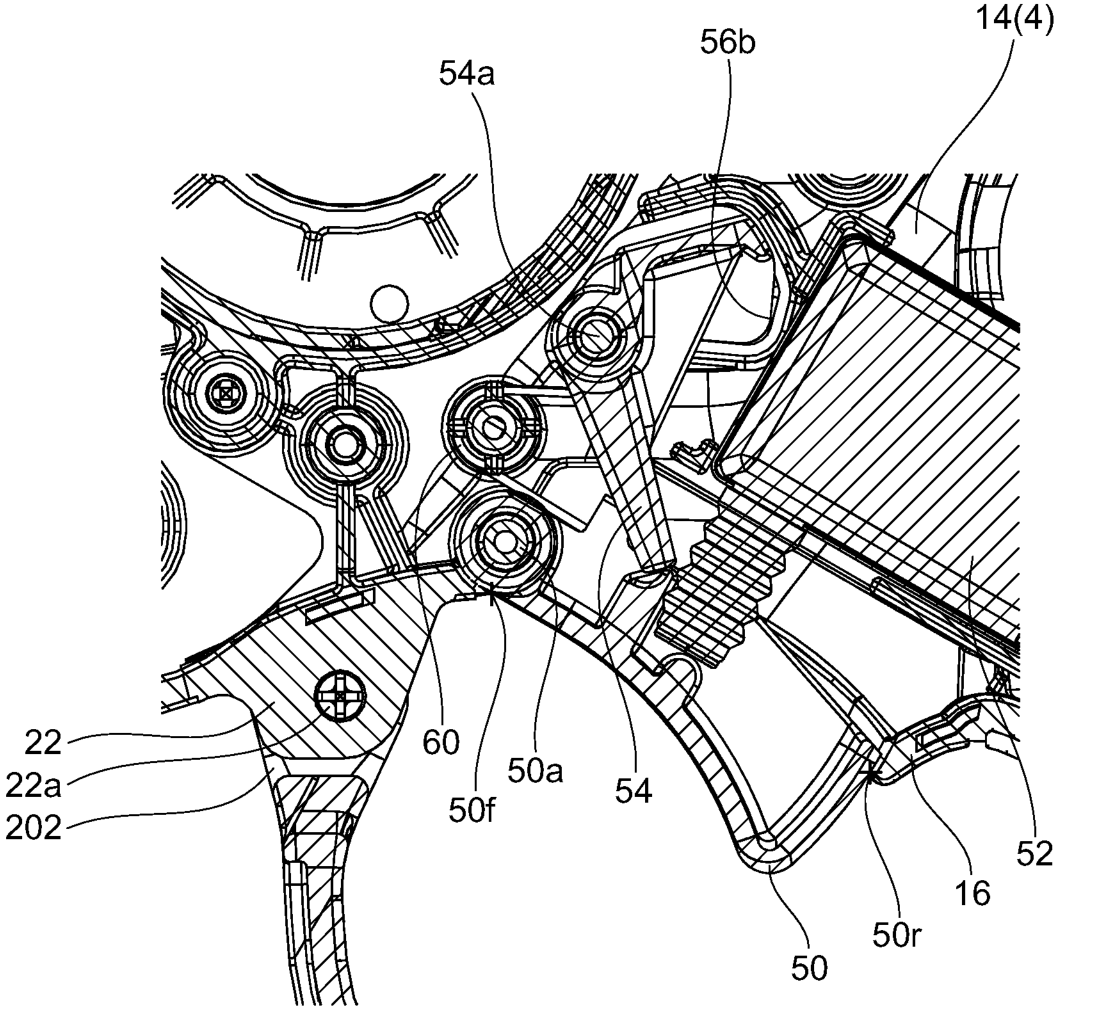
FIG. 5 is a cross-sectional view seeing an internal structure in proximity to a base end of a grip 16 of the chainsaw T1 of the first embodiment seen from the left.
Figure 5:
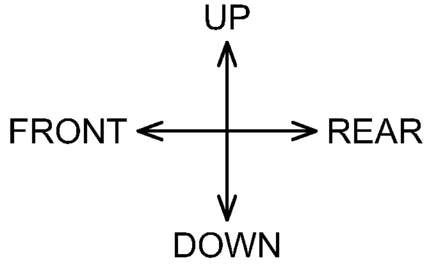

As shown in FIG. 2, the trigger lever 50 for the user to drive and operate the working unit 10 is disposed on a lower surface in proximity to the base end of the grip 16. As shown in FIG. 5, the trigger lever 50 is supported by the housing 4 so as to be rotatable about a rotation axis 50*a* extending in the left-right direction. The user can operate to pull up the trigger lever toward the grip 16. Further, in the description herein, a front end of a portion of the trigger lever 50 exposed outside the grip 16 will simply be termed "front end 50*f*". A rear end of the portion of the trigger lever 50 exposed outside the grip 16 will simply be termed "rear end 50*r*".

The trigger switch 52 configured to detect pulling operation performed on the trigger lever 50 by the user is disposed inside the housing 4. The trigger switch 52 is disposed right above the trigger lever 50 and extends between the grip 16 and the housing body 14. The trigger switch 52 is electrically connected to the control unit 62 (see FIG. 6). The trigger switch 52 is configured to output a trigger-on signal to the control unit 62 while the pulling operation is performed on the trigger lever 50. Further, a lock member 54 configured to switch between a state allowing the user to perform operation on the trigger lever 50 and a state prohibiting the user from doing so is further disposed inside the housing 4. The lock member 54 is disposed right above the trigger lever 50 and frontward of the trigger switch 52. The lock member 54 is supported by the housing 4 rotatably about a rotation axis 54*a* extending in the left-right direction.

In a state where the lock member 54 is rotated up, the lock member 54 mechanically interferes with the trigger lever 50 and upward rotation of the trigger lever 50 is thereby prohibited. In a state where the lock member 54 is rotated down, the lock member 54 no longer interferes with the trigger lever 50 and the upward rotation of the trigger lever 50 is thereby allowed.

As shown in FIG. 1, the lock member 54 includes a left lock lever 58*a* protruding to the outside of the housing 4 via a through hole 56*a* defined in a left side surface of the housing 4. As shown in FIG. 2, the lock member 54 includes a right lock lever 58*b* protruding to the outside of the housing 4 via a through hole 56*b* defined in a right side surface of the housing 4. Hereinbelow, the left lock lever 58*a* and the right lock lever 58*b* may collectively be termed "lock levers 58". The user can operate to rotate the lock member 54 via the lock levers 58.

The trigger lever 50 and the lock member 54 are coupled to each other by a torsion spring 60 (see FIG. 5). The torsion spring 60 is configured to bias the trigger lever 50 in a direction of rotating downward, and biases the lock member 54 in a direction of rotating upward. Due to this, when the user has his/her hand off the trigger lever 50, the trigger lever 50 is in a state of having rotated down by a biasing force of the torsion spring 60. Further, when the user has his/her hand off the lock levers 58, the lock member 54 is in a state of having rotated up by a biasing force of the torsion spring 60.

For example, when the user uses the chainsaw T1, the user holds the chainsaw T1 by grasping the grip 16 with the right hand and the left hand placed at the top portion 14*a*. From this state, when the user presses down the lock levers 58 with the right thumb, the user's operation on the trigger lever 50 is thereby allowed, and the working unit 10 is actuated by the user pulling the trigger lever 50 with the right index finger in this state.

(Configuration of Hand Guard 20)

The hand guard 20 shown in FIG. 1 is a protector for protecting the user's hand grasping the grip 16. If the saw chain 8 breaks while the user is performing the cutting work (while driving the working unit 10), the broken saw chain 8 may spin off the guide bar 6 with the driving force still carried thereon. In such a case, the hand guard 20 can suppress the saw chain 8 that spun off the guide bar 6 from contacting the user's hand grasping the grip 16 (see FIG. 1). The hand guard 20 is constituted of a material having Young's modulus within a range from 1 MPa to 100 MPa, for example. The hand guard 20 of the present embodiment is constituted for example of rubber such as nitrile butadiene rubber. Young's modulus of nitrile butadiene rubber can be said as being within the range from 1 MPa to 10 MPa, although it is subject to change by its surrounding environment.

The hand guard 20 includes a first end 202, a second end 204, and a guard body 206 continuously extending between the first end 202 and the second end 204. The first end 202 is attached to the first attachment portion 22 in a state of being rotatable about a rotation axis 22*a* extending in the left-right direction. By being attached to the first attachment portion 22, the first end 202 is disposed in proximity to the base end of the grip 16. Further, the second end 204 is attached to the second attachment portion 24 in a state of being rotatable about a rotation axis 24*a* extending in the left-right direction (see FIG. 2). By being attached to the second attachment portion 24, the second end 204 is disposed in proximity to the distal end of the grip 16.

The guard body 206 includes a plate portion 208 having a plate shape and a plurality of rib portions 210 protruding downward from a lower surface of the plate portion 208 (see FIG. 3). The plate portion 208 is disposed such that its upper surface faces the grip 16. In the present embodiment, a thickness of the plate portion 208 (thickness in a direction perpendicular to upper and lower surfaces of the plate portion 208) is for example about 5 mm.

As shown in FIG. 3, when the chainsaw T1 is seen from below, the plate portion 208 has a substantially rectangular shape. The plate portion 208 has a width of about 29 mm on the left side of a left surface of the guide bar 6, for example. The plate portion 208 has a width of about 30 mm on the right side of a right surface of the guide bar 6, for example. Further, the plate portion 208 has a width of about 30 mm on the left side of a left surface of the grip 16, for example (see FIG. 1). The plate portion 208 has a width of about 0.5 mm on the right side of a right surface of the grip 16, for example.

The plurality of rib portions 210 includes first rib portions 212 extending in the front-back direction along the lower surface of the plate portion 208, second rib portions 214 extending in the left-right direction along the lower surface of the plate portion 208, and a third rib portion 216 extending along a peripheral portion on the lower surface of the plate portion 208. There are four first rib portions 212 arranged along the left-right direction. When the chainsaw T1 is seen from below, each of the first rib portions 212 extends substantially straight between the first end 202 and the second end 204. Further, there are three second rib portions 214 arranged along the front-back direction. The first rib portions 212 and the second rib portions 214 are connected at portions that intersect each other. The second rib portions 214 are connected to the third rib portion 216 at their left and right ends.

Figure 6:
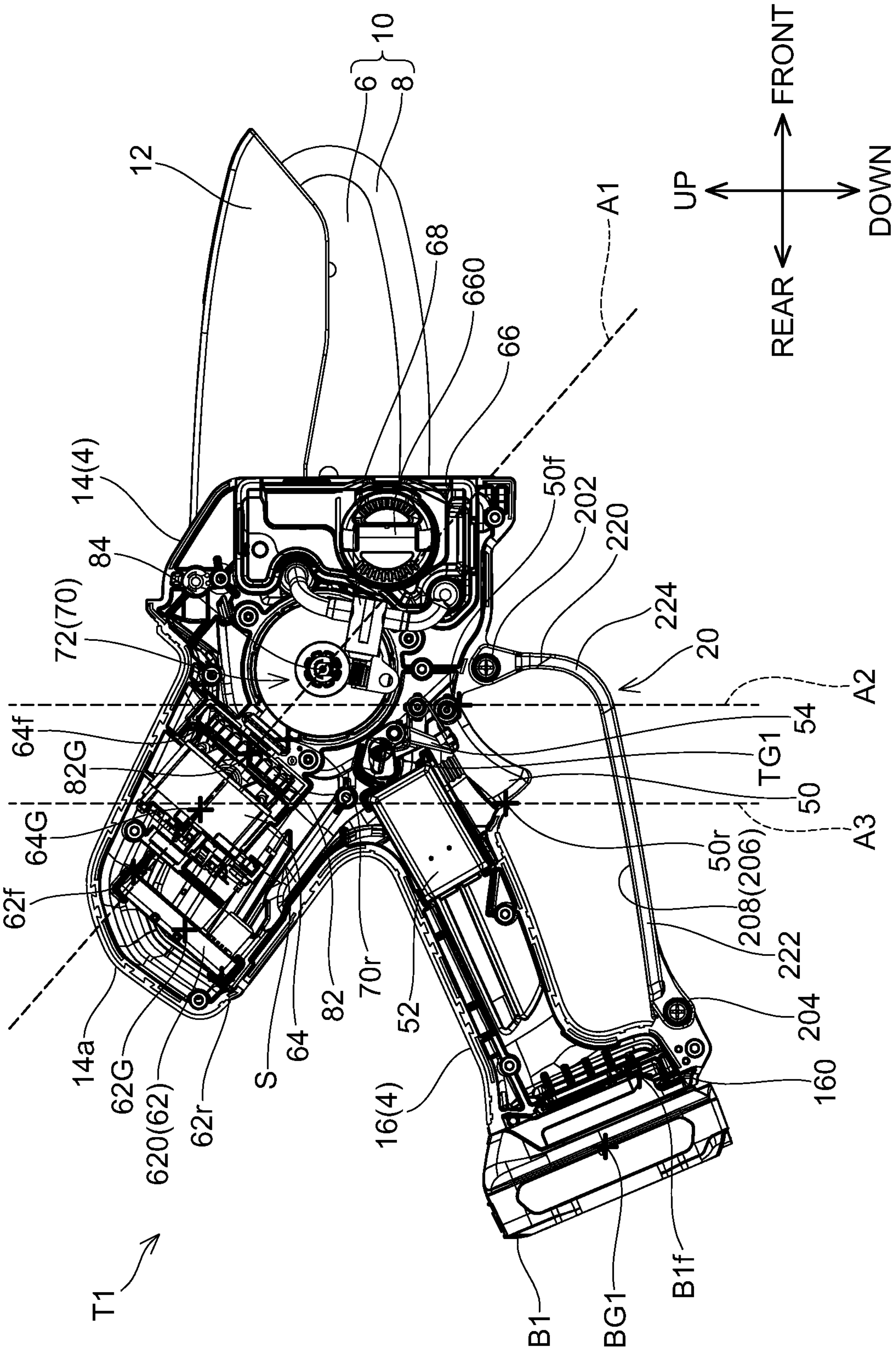
FIG. 6 is a cross-sectional view seeing an internal structure of a housing 4 of the chainsaw T1 of the first embodiment seen from the right.

As shown in FIG. 6, the plate portion 208 comprises a first extending portion 220 extending to separate away from the grip 16 from its base end side toward its distal end side, a second extending portion 222 extending to separate away from the grip 16 from its distal end side toward its base end side, and a bending portion 224 connecting the first extending portion 220 and the second extending portion 222. A length of the first extending portion 220 in its extending direction is shorter than a length of the second extending portion 222 in its extending direction. A bending angle of the bending portion 224 may for example be 100°. A curvature radius of the bending portion 224 may for example be 18 mm. Due to this, in a natural state (state in which external force is not applied to the hand guard 20), the hand guard 20 has a shape protruding outward as seen from the grip 16.

With the hand guard 20 configured as described above, the hand guard 20 is elastically more deformable than the housing 4. The hand guard 20 is configured to start deforming by application of a predetermined load of 5 N or less from a direction facing the lower surface of the plate portion 208, for example. "Start deforming" herein means that elastic strain of the hand guard 20 exceeds 1%. Due to this, the user can deform the hand guard 20 with a relatively small load.

(Internal Structure of Chainsaw T1)

As shown in FIG. 6, the control unit 62, an electric motor 64, an oil tank 66, an oil pump 68, a reduction gear 72, and a cooling fan 82 are housed inside the housing body 14.

Figure 7:
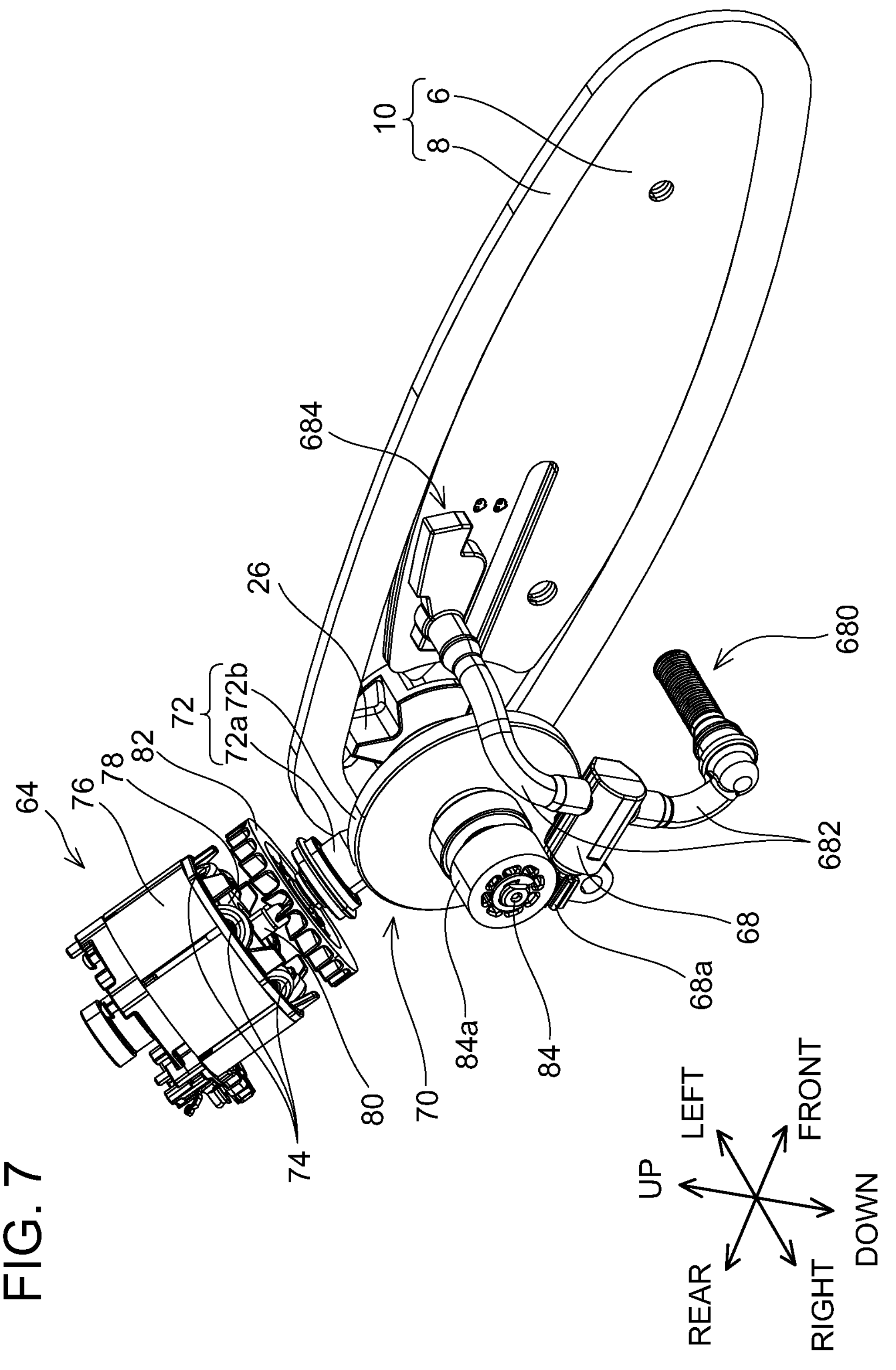
FIG. 7 is a view seeing an electric motor 64, a motor shaft 80, a cooling fan 82, a transmission mechanism 70, an oil pump 68, a sprocket 26, and a working unit 10 of the chainsaw T1 of the first embodiment from front right upper side.

As shown in FIG. 7, the electric motor 64 is an inner rotor DC brushless motor. The electric motor 64 includes a stator 76 on which a coil 74 is wound and a rotor 78 disposed inside the stator 76 and including a permanent magnet (not shown). In the present embodiment, weight of the electric motor 64 (coil 74, stator 76, and rotor 78) is for example about 180 grams. A motor shaft 80 disposed to penetrate through centers of the stator 76 and the rotor 78 is fixed to the rotor 78. Due to this, the electric motor 64 is configured to rotate the motor shaft 80.

The cooling fan 82 is fixed to the motor shaft 80 at a position lower than the rotor 78. The cooling fan 82 rotates accompanying rotation of the motor shaft 80. When the cooling fan 82 rotates, a flow of air directed upward from below is formed along an axis line A1 of the motor shaft 80 (see FIG. 6). At this time, air is suctioned inside from outside the housing 4 through a left air inlet 140 (see FIG. 1) and a right air inlet 142 (see FIG. 2). Further, air is discharged outside from inside the housing 4 through a left air outlet 144 (see FIG. 1) and a right air outlet 146 (see FIG. 2). Due to this, the cooling fan 82 can cool the electric motor 64 accompanying the actuation of the electric motor 64.

The reduction gear 72 includes a first bevel gear **72*a* fixed to the motor shaft 80 at a position lower than the cooling fan 82 and a second bevel gear 72*b* meshed with the first bevel gear 72*a*. The second bevel gear 72*b* is fixed to the drive shaft 84. The drive shaft 84 is supported by the housing 4 (see FIG. 1) so as to be rotatable about a rotation axis extending in the left-right direction. The sprocket 26 is fixed to the drive shaft 84 on the left side of the second bevel gear 72*b*. Due to this, when the electric motor 64 is driven, rotary motion of the motor shaft 80 is transmitted to the saw chain 8 through the reduction gear 72, the drive shaft 84, and the sprocket 26. Due to this, the saw chain 8 rotates around the sprocket 26 and the guide bar 6**.

The oil tank 66 shown in FIG. 6 is a tank for storing lubricant oil for lubricating the saw chain 8. The oil tank 66 can store up to about 50 cc of lubricant oil. The oil tank 66 has an oil inlet (not shown) for replenishing the lubricant oil in the oil tank 66. The oil inlet has a cap 660 detachably attached thereto. The oil tank 66 is disposed in proximity to a front end of the housing body 14. As shown in FIG. 2, the cap 660 and the oil inlet of the oil tank 66 are exposed to the outside of the housing body 14. Due to this, the user can detach the cap 660 from the oil inlet without disassembling the housing body 14 and fill the oil tank 66.

As shown in FIG. 7, the drive shaft 84 has a worm gear **84*a* fixed thereto on the right side of the second bevel gear 72*b*. The worm gear 84*a* meshes with a worm wheel 68*a* of the oil pump 68. Due to this, when the electric motor 64 is driven, the rotary motion of the motor shaft 80 is transmitted to the oil pump 68 through the reduction gear 72, the drive shaft 84, the worm gear 84*a*, and the worm wheel 68*a*. Due to this, the oil pump 68 is driven. When the oil pump 68 is driven, the lubricant oil is suctioned into an oil supply path 682 through an intake portion 680 disposed inside the oil tank 66 (see FIG. 6). Then, the lubricant oil is supplied from the oil supply path 682 via a discharge portion 684 to the guide bar 6 and the saw chain 8**.

In the description herein, a mechanism composed of the reduction gear 72, the drive shaft 84, and the worm gear **84*a* may be termed "transmission mechanism 70". As shown in FIG. 6, the transmission mechanism 70 is disposed at a center portion of the housing body 14. The transmission mechanism 70 is disposed on front lower side of the electric motor 64. The transmission mechanism 70 is disposed rearward of the oil tank 66. In the present embodiment, weight of the transmission mechanism 70** is for example about 110 grams.

The control unit 62 is disposed just below the top portion **14*a* of the housing body 14. The control unit 62 is disposed on upper rear side of the electric motor 64. A wiring space S is defined below the control unit 62 and rearward of the electric motor 64. Although not shown, majority of conductor wires electrically connecting the respective constituent components such as the control unit 62 and the electric motor 64** are arranged through the wiring space S.

The control unit 62 includes a control board (not shown) on which an inverter circuit including a plurality of switching elements and a control circuit configured to control operation of each of those switching elements are mounted, and a controller case 620 that has a substantially rectangular box shape and houses the control board. The controller case 620 is constituted of metal such as aluminum. In the present embodiment, weight of the control unit 62 is about 60 grams.

While the trigger-on signal is outputted from the trigger switch 52, the control unit 62 converts DC power supplied from the battery pack B1 to three-phase AC power and supplies the same to the electric motor 64. When the trigger-on signal is no longer outputted from the trigger switch 52, the control unit 62 cuts off power supply from the battery pack B1 to the electric motor 64. Further, the control unit 62 controls actuation of the electric motor 64 so that the saw chain 8 runs in a predetermined running direction. The predetermined running direction herein refers to a direction along which the saw chain 8 runs frontward above the guide bar 6 and runs rearward below the guide bar 6.

(Positional Relationship of Primary Constituent Components and Axis Line A1)

The axis line A1 of the motor shaft 80 (see FIG. 7) is on a plane spreading along the front-back and up-down directions. The axis line A1 is inclined frontward from the upper side toward the lower side along the up-down direction. An inclination angle of the axis line A1 with respect to the up-down direction is 41° in the present embodiment. The control unit 62 is disposed on the axis line A1. The control unit 62 (controller case 620) is disposed along a plane that is substantially perpendicular to the axis line A1. A distance from the axis line A1 to a front end 62*f* of the control unit 62 (which coincides a front end of the controller case 620) is smaller than a distance from the axis line A1 to a rear end 62*r* of the control unit 62 (which coincides a rear end of the controller case 620). Further, the drive shaft 84 of the transmission mechanism 70 is disposed substantially perpendicular to the axis line A1.

Figure 8:
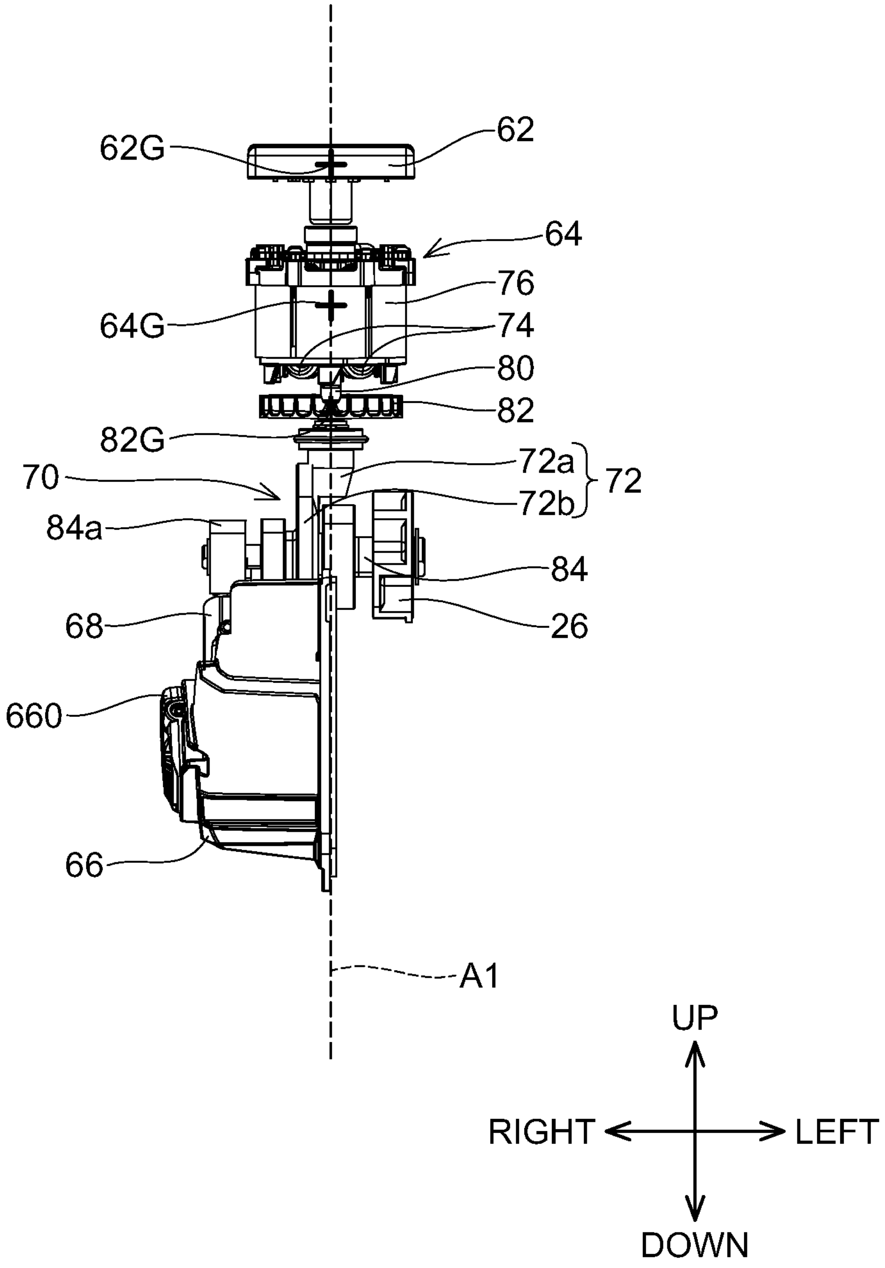
FIG. 8 is a diagram seeing inside of the housing body 14 of the chainsaw T1 of the first embodiment from the front along a direction perpendicular to an axis line A1 of the motor shaft 80.

As shown in FIG. 8, when the inside of the housing body 14 (see FIG. 1) is seen from the front along a direction perpendicular to the axis line A1, the control unit 62, the electric motor 64, the cooling fan 82, the transmission mechanism 70 and the sprocket 26, and the oil tank 66 are arranged substantially in a line in this order from the higher side. When seen from the front along the direction perpendicular to the axis line A1, a position of gravity center 62G of the control unit 62, a position of gravity center 64G of the electric motor 64, and a position of gravity center 82G of the cooling fan 82 are respectively disposed on the axis line A1.

When seen from the front along the direction perpendicular to the axis line A1, each of the control unit 62, the electric motor 64, and the cooling fan 82 has a substantially left-right symmetric shape (substantially in linear symmetry with respect to the axis line A1). Although not shown, the grip 16 (see FIG. 1) and the battery pack B1 (see FIG. 1) similarly have substantially left-right symmetric shapes (substantially in linear symmetry with respect to the axis line A1). Further, the sprocket 26 is disposed to the left of the axis line A1. The oil tank 66, the oil pump 68, the second bevel gear 72*b*, and the worm gear 84*a* are disposed to the right of the axis line A1.

(Positional Relationship of Primary Constituent Components Relative to Trigger Lever 50)

FIG. 6 depicts a straight line A2 extending in the up-down direction through the front end 50*f* of the trigger lever 50 and a straight line A3 extending in the up-down direction through the rear end 50*r* of the trigger lever 50.

The front end 62*f* of the control unit 62 is disposed rearward of the rear end 50*r* of the trigger lever 50. A front end 64*f* of the electric motor 64 is disposed rearward of the front end 50*f* of the trigger lever 50 and frontward of the rear end 50*r* of the trigger lever 50. A rear end 70*r* of the transmission mechanism 70 (which coincides a rear end of the first bevel gear 72*a*) is disposed rearward of the front end 50*f* of the trigger lever 50 and frontward of the rear end 50*r* of the trigger lever 50. A front end B1*f* of the battery pack B1 is disposed rearward of the rear end 50*r* of the trigger lever 50. Further, the position of gravity center 62G of the control unit 62 is disposed rearward of the rear end 50*r* of the trigger lever 50. The position of gravity center 64G of the electric motor 64 is disposed rearward of the rear end 50*r* of the trigger lever 50. The position of gravity center 82G of the cooling fan 82 is disposed rearward of the front end 50*f* of the trigger lever 50 and frontward of the rear end 50*r* of the trigger lever 50. A position of gravity center BG1 of the battery pack B1 is disposed rearward of the rear end 50*r* of the trigger lever 50.

In the chainsaw T1 configured as described above, a position of gravity center TG1 of the chainsaw T1 is disposed inside the housing 4 between the straight lines A2 and A3. The position of gravity center TG1 can be said as being a position overlapped with the lock member 54. Further, a distance from the straight line A2 to the position of gravity center TG1 and a distance from the straight line A3 to the position of gravity center TG1 are configured substantially the same. In the present embodiment, the position of gravity center TG1 is determined under a state in which a full amount of lubricant oil is stored in the oil tank 66, the battery pack B1 is attached to the battery interface 160, and other constituent components are all attached.

SECOND EMBODIMENT

Figure 9:
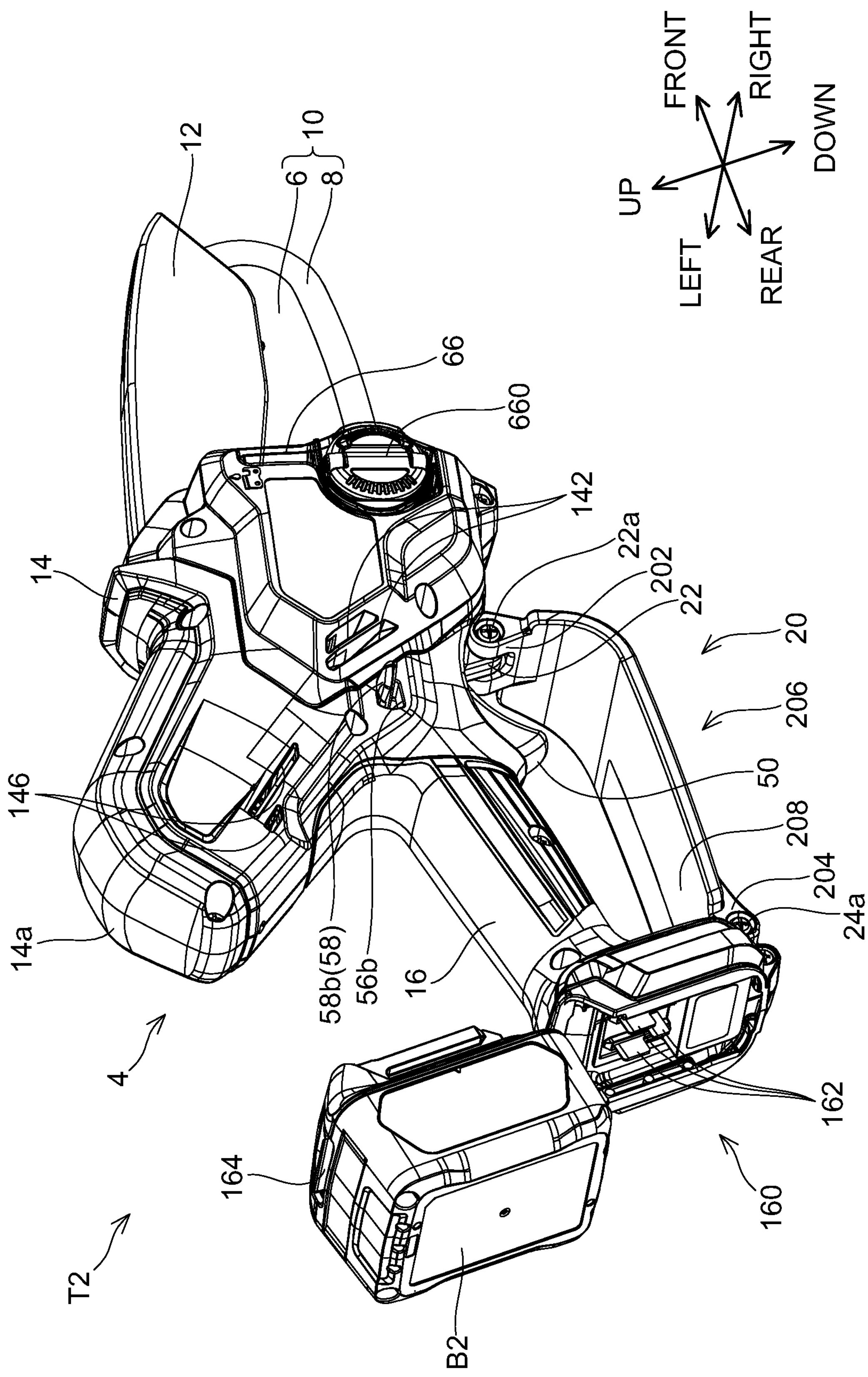
FIG. 9 is a perspective view seeing a chainsaw T2 of a second embodiment from the rear right upper side in a state of having a battery pack B2 detached from a battery interface 160.

As shown in FIG. 9, a cutter machine of the present embodiment is a chainsaw T2. The chainsaw T2 has substantially the same configuration as the chainsaw T1 of the first embodiment except that it comprises a battery pack B2 instead of the battery pack B1. Hereinbelow, explanation will be given only on the differences between the chainsaw T2 and the chainsaw T1.

The battery pack B2 houses a rechargeable secondary battery such as a lithium ion battery. An output voltage of the battery pack B2 may for example be 10V. A battery capacity of the battery pack B2 may for example be 4.0 Ah. Weight of the battery pack B2 may for example be about 375 grams. The battery pack B2 is configured to be detachably attached to the battery interface 160 similar to the battery pack B1.

As compared to the battery pack B1 (see FIG. 2), the battery pack B2 has a larger width in the extending direction of the grip 16. A width of the battery pack B2 in the left-right direction is about the same as that of the battery pack B1. A width of the battery pack B2 in a direction perpendicular to the extending direction of the grip 16 and the left-right direction is about the same as that of the battery pack B1. Due to this, a volume of the battery pack B2 is larger than a volume of the battery pack B1.

Figure 10:
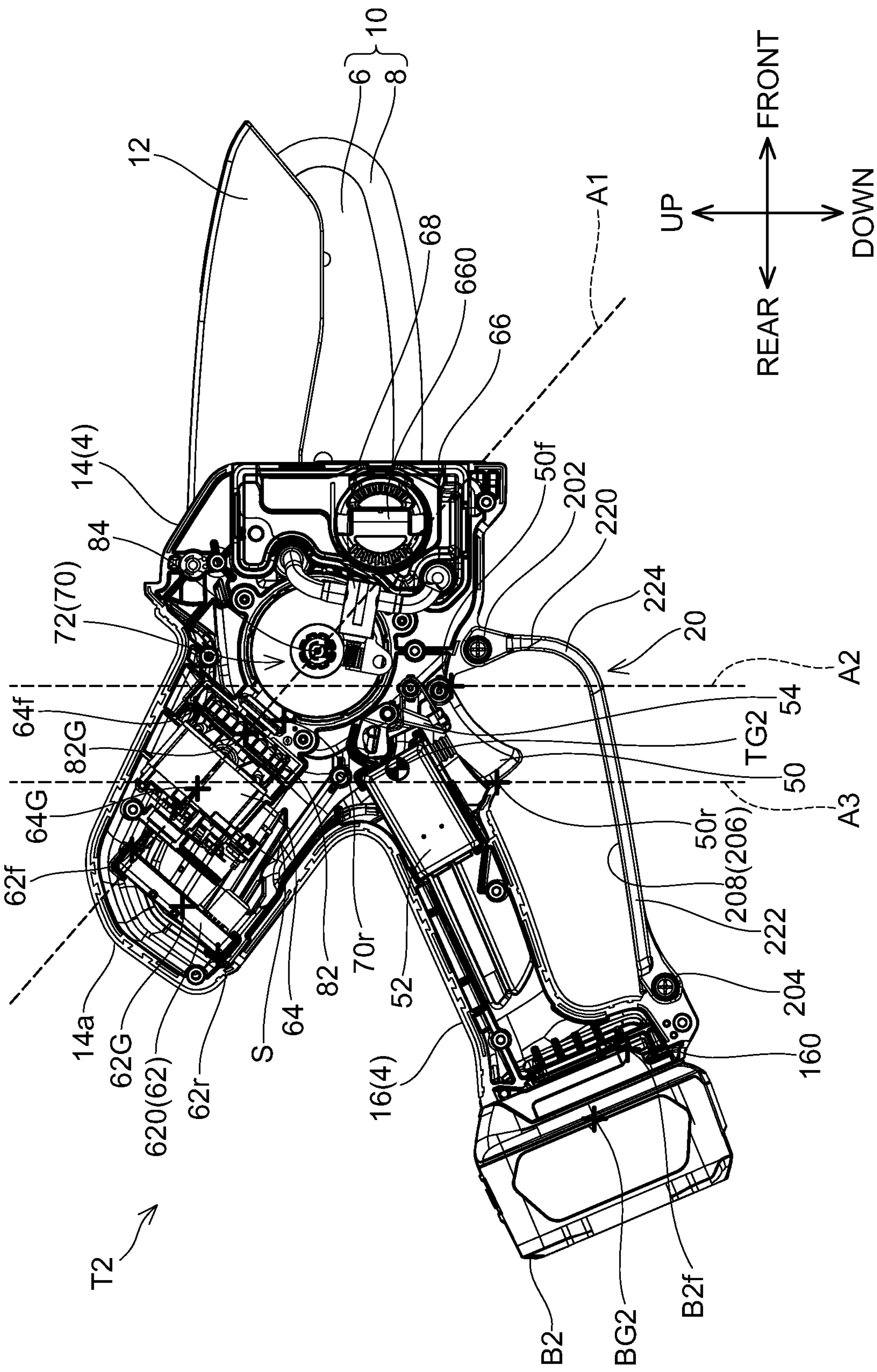
FIG. 10 is a cross-sectional view seeing an internal structure of a housing 4 of the chainsaw T2 of the second embodiment seen from the right.

As shown in FIG. 10, a front end B2*f* and a position of gravity center BG2 of the battery pack B2 are disposed rearward of the rear end 50*r* of the trigger lever 50. Further, a position of gravity center TG2 of the chainsaw T2 is disposed inside the housing 4 and between the straight lines A2 and A3. The position of gravity center TG2 may be said as being located in proximity to a front end of the trigger switch 52. Further, a distance from the straight line A2 to the position of gravity center TG2 is larger than a distance from the straight line A3 to the position of gravity center TG2.

THIRD EMBODIMENT

Figure 11:
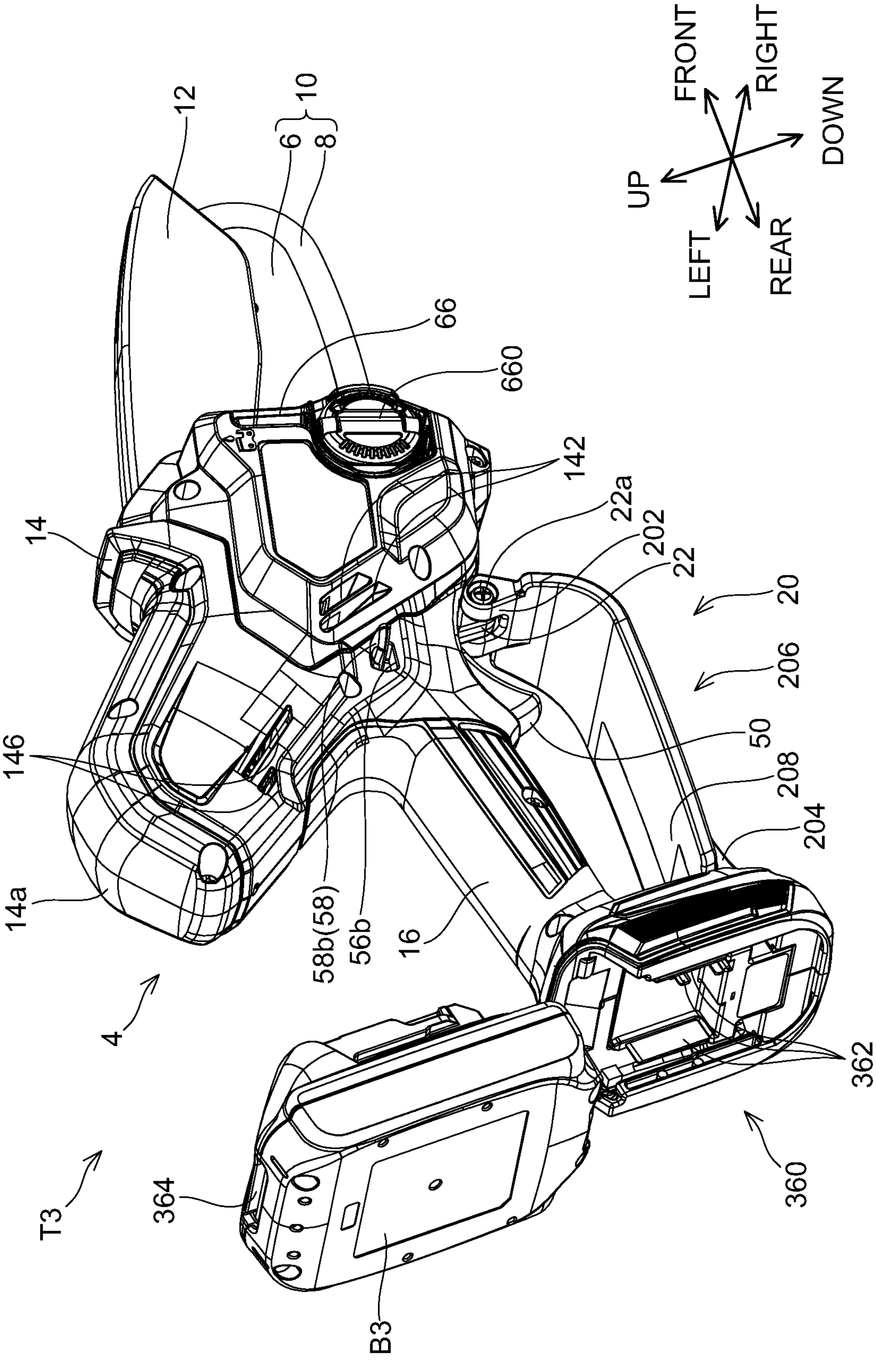
FIG. 11 is a perspective view seeing a chainsaw T3 of a third embodiment from the rear right upper side in a state of having a battery pack B3 detached from a battery interface 360.

As shown in FIG. 11, a cutter machine of the present embodiment is a chainsaw T3. The chainsaw T3 has substantially the same configuration as the chainsaw T1 of the first embodiment except that it comprises a battery pack B3 instead of the battery pack B1 and a battery interface 360 instead of the battery interface 160. Hereinbelow, explanation will be given only on the differences between the chainsaw T3 and the chainsaw T1.

The battery pack B3 houses a rechargeable secondary battery such as a lithium ion battery. An output voltage of the battery pack B3 may for example be 18V. A battery capacity of the battery pack B3 may for example be 2.0 Ah. Weight of the battery pack B3 may for example be about 375 grams. A width of the battery pack B3 in the extending direction of the grip 16 is about the same as that of the battery pack B1 (see FIG. 2). As compared to the battery pack B1, the battery pack B3 has a wider width in the left-right direction. As compared to the battery pack B1, the battery pack B3 has a wider width in the direction perpendicular to the extending direction of the grip 16 and the left-right direction. Due to this, a volume of the battery pack B3 is larger than the volume of the battery pack B1.

The battery pack B3 is configured to be attached to the battery interface 360 by sliding the battery pack B3 toward the front lower side from the rear upper side. Further, the battery interface 360 includes a connection terminal 362 for connecting with a terminal (not shown) of the battery pack B3. The connection terminal 362 is electrically connected with the control unit 62 (see FIG. 12) and the trigger switch 52 (see FIG. 12). When the battery pack B3 is attached to the battery interface 360, the terminal of the battery pack B3 and the connection terminal 362 are electrically connected. This allows electric power supply from the battery pack B3 to the control unit 62 and the trigger switch 52.

Figure 12:
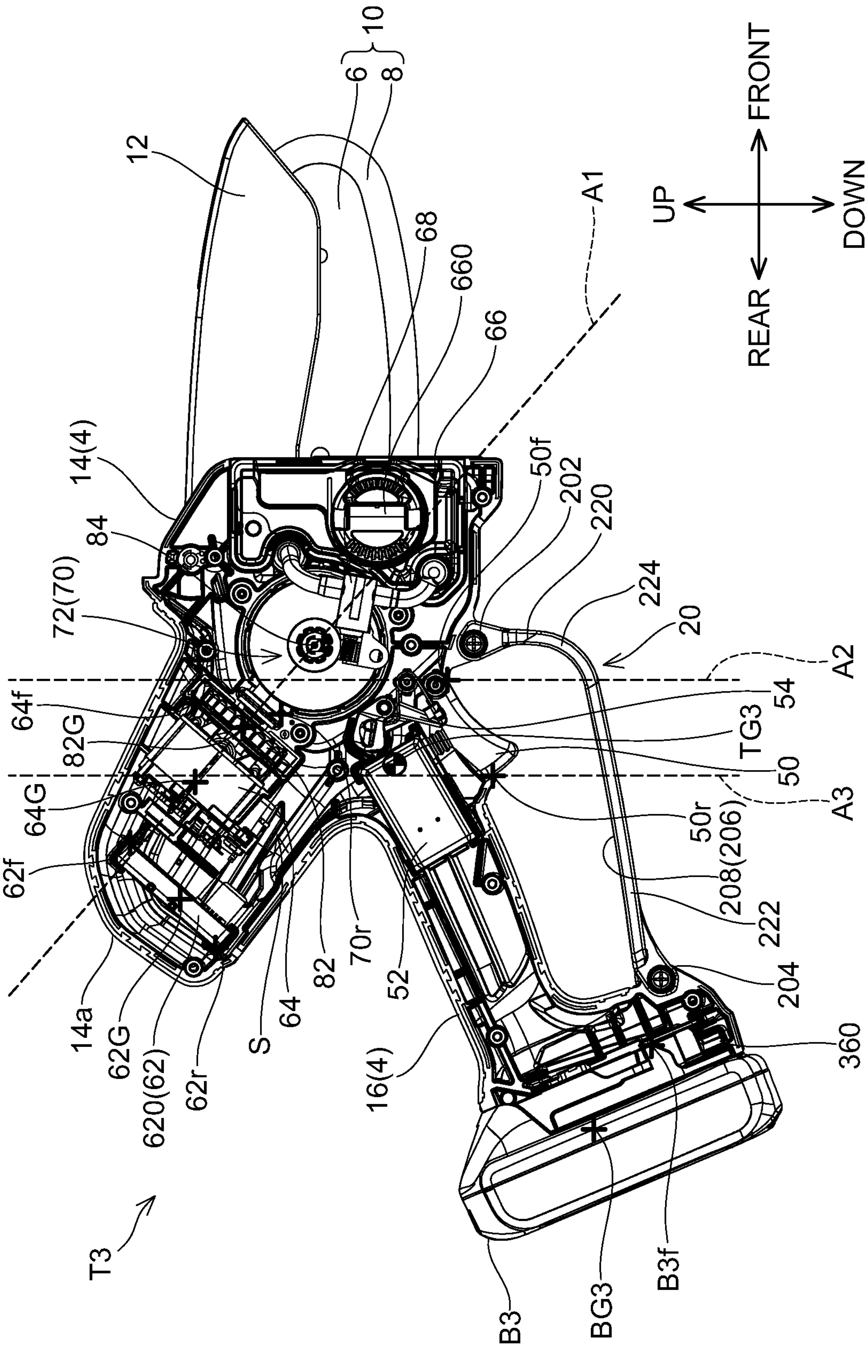
FIG. 12 is a cross-sectional view seeing an internal structure of a housing 4 of the chainsaw T3 of the third embodiment seen from the right.

As shown in FIG. 12, when the battery pack B3 is attached to the battery interface 360, outer surfaces of the battery pack B3 and the grip 16 are smoothly connected. Further, the battery pack B3 is configured to be detached by sliding it toward the rear upper side from the front lower side with respect to the battery interface 360 with a hook 364 arranged on the battery pack B3 pressed in (see FIG. 11).

A front end B3*f* and a position of gravity center BG3 of the battery pack B3 are disposed rearward of the rear end 50*r* of the trigger lever 50. Further, a position of gravity center TG3 of the chainsaw T3 is inside the housing 4 and disposed between the straight lines A2 and A3. The position of gravity center TG3 can be said as being located in proximity to a front end of the trigger switch 52. Further, a distance from the straight line A2 to the position of gravity center TG3 is larger than a distance from the straight line A3 to the position of gravity center TG3. In the present embodiment, the position of gravity center TG3 of the chainsaw T3 is located substantially at the same position as the gravity center of the TG2 of the chainsaw T2 of the second embodiment.

FOURTH EMBODIMENT

Figure 13:
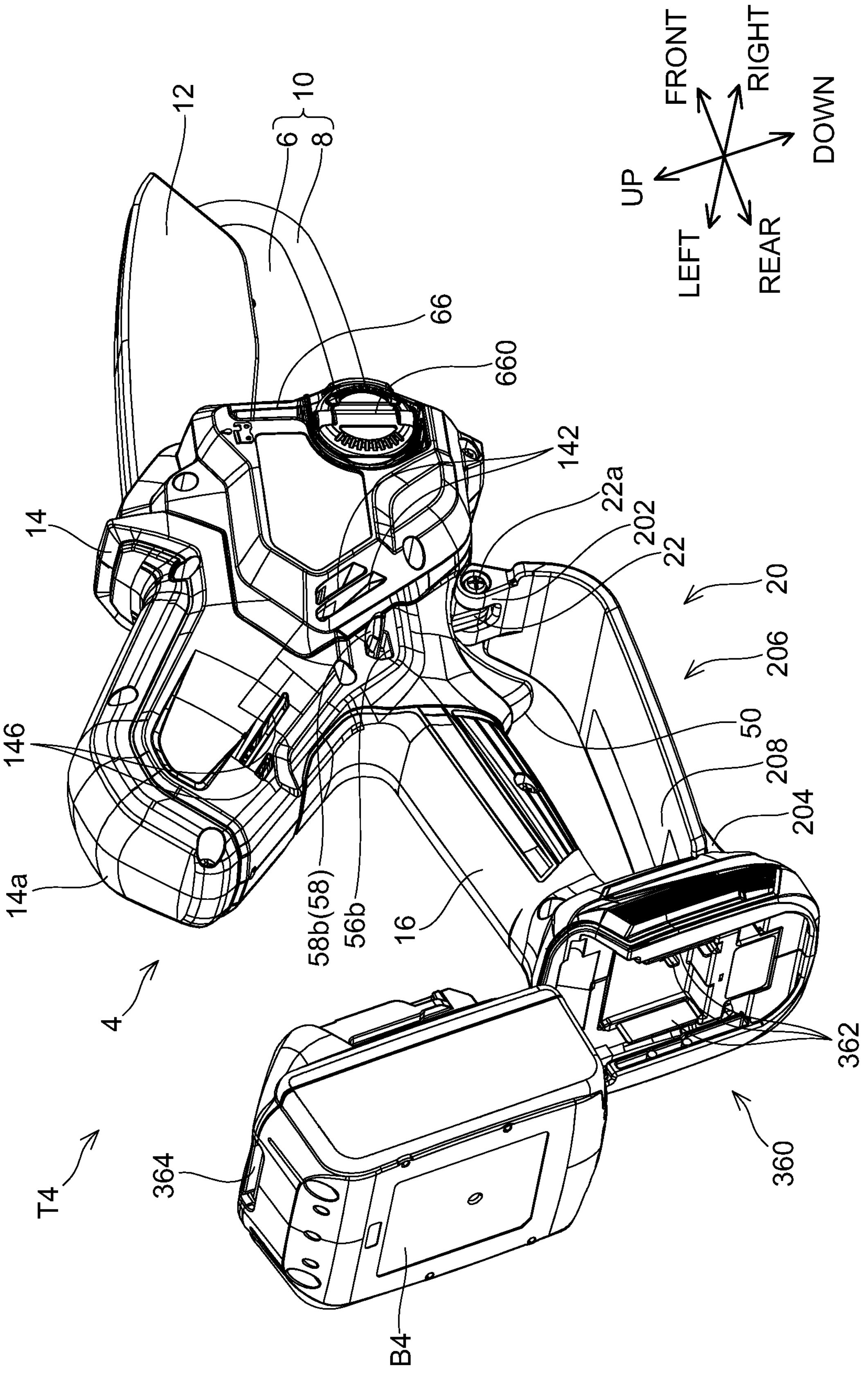
FIG. 13 is a perspective view seeing a chainsaw T4 of a fourth embodiment from the rear right upper side in a state of having a battery pack B4 detached from a battery interface 360.

As shown in FIG. 13, a cutter machine of the present embodiment is a chainsaw T4. The chainsaw T4 has substantially the same configuration as the chainsaw T3 of the third embodiment except that it comprises a battery pack B4 instead of the battery pack B3. Hereinbelow, explanation will be given only on the differences between the chainsaw T4 and the chainsaw T3.

The battery pack B4 houses a rechargeable secondary battery such as a lithium ion battery. An output voltage of the battery pack B4 may for example be 18V. A battery capacity of the battery pack B4 may for example be 6.0 Ah. Weight of the battery pack B4 may for example be about 670 grams. Similar to the battery pack B3, the battery pack B4 is configured to be detachably attached to the battery interface 360.

As compared to the battery pack B3 (see FIG. 11), the battery pack B4 has a wider width in the extending direction of the grip 16. A width of the battery pack B4 in the left-right direction is about the same as that of the battery pack B3. A width of the battery pack B4 in the direction perpendicular to the extending direction of the grip 16 and the left-right direction is about the same as that of the battery pack B3. Due to this, a volume of the battery pack B4 is larger than the volume of the battery pack B3.

Figure 14:
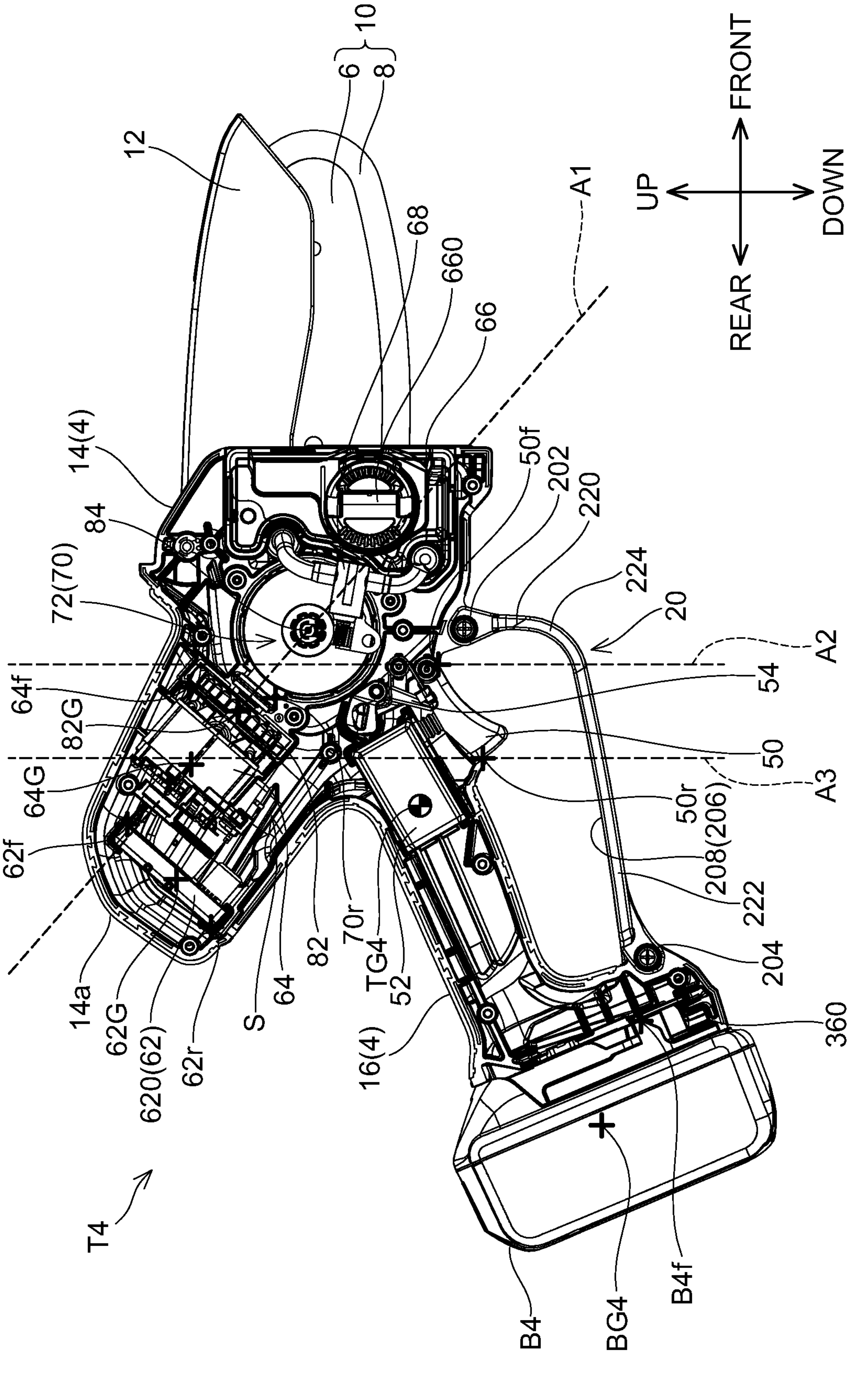
FIG. 14 is a cross-sectional view seeing an internal structure of a housing 4 of the chainsaw T4 of the fourth embodiment seen from the right.

As shown in FIG. 14, a front end B4*f* and a position of gravity center BG4 of the battery pack B4 are disposed rearward of the rear end 50*r* of the trigger lever 50. Further, a position of gravity center TG4 of the chainsaw T4 is disposed inside the housing 4 and rearward of the straight line A3. The position of gravity center TG4 can also be said as being located in proximity to a rear end of the trigger switch 52.

Hereinbelow, the chainsaw T1, the chainsaw T2, the chainsaw T3, and the chainsaw T4 may collectively be termed "chainsaw T".

(Variants)

In the above embodiments, examples in which the cutter machine is the chainsaw T that comprises the guide bar 6 and the saw chain 8 as the working unit 10 have been explained. In another embodiment, the cutter machine may be a reciprocating saw including a saw blade as its working unit 10. Further, in yet another embodiment, the cutter machine may be electric scissors including scissor blades as its working unit 10. When the cutter machine is a reciprocating saw or electric scissors, the cutter machine may not comprise the oil tank 66 and the oil pump 68.

In the above embodiments, the configurations in which the chainsaw T is a pruning chainsaw that is expected to be carried by one hand have been explained. In another embodiment, the chainsaw T may be a large-sized chainsaw with a handle to be grasped by a hand different from the hand grasping the grip (corresponding to the grip 16), that is, a chainsaw that is expected to be carried by both hands. In this case, the handle to be grasped by the other hand may be disposed at an upper portion of its housing (corresponding to the housing 4) or may be disposed on a lateral side of the housing.

In the above embodiments, the configurations in which the electric motor 64 is the inner rotor DC brushless motor have been explained. In another embodiment, the electric motor 64 may be an outer rotor DC brushless motor. Alternatively, the electric motor 64 may be a brush motor or another type of motor.

In the above embodiments, the chainsaw T (an example of the cutter machine) may comprise an internal combustion engine instead of the electric motor 64 as the prime mover configured to rotate the sprocket 26. In this case, the drive shaft 84 fixed to the sprocket 26 may be configured to be rotated by actuation of the engine.

In the above embodiments, the configurations in which the housing 4 is constituted of plastic such as polyamide have been explained. In another embodiment, plastic other than polyamide with Young's modulus of 100 MPa or more (such as polycarbonate) may be used for the housing 4. Further, in yet another embodiment, the housing 4 may be constituted of a material (such as metal, aluminum in particular) other than plastic so long as the material has Young's modulus of 100 MPa or more.

In the above embodiments, the configurations in which the hand guard 20 is constituted of rubber such as nitrile butadiene rubber have been explained. In another embodiment, the hand guard 20 may be constituted of rubber other than nitrile butadiene rubber (such as ethylene propylene rubber) so long as this material has Young's modulus within a range from 1 MPa to 100 MPa.

In the above embodiments, at least one of the first end 202 and the second end 204 of the hand guard 20 may be attached to its corresponding one of the first attachment portion 22 and the second attachment portion 24 in a state not being able to rotate with respect to the attached one of the first attachment portion 22 and the second attachment portion 24.

In the above embodiments, the plurality of rib portions 210 of the hand guard 20 may not comprise at least one (rib group) of the first rib portions 212, the second rib portions 214, and the third rib portion 216. That is, one group of the three rib groups, namely, the first rib portions 212, the second rib portions 214, and the third rib portion 216 may be omitted from the plurality of rib portions 210.

In the above embodiments, the configurations in which the hand guard 20 is constituted of a material with relatively low Young's modulus (rubber) so that it deforms more easily than the housing 4 have been explained. In another embodiment, the hand guard 20 may be configured swingable with respect to the housing 4, that is, similar to a so-called swing door. In this case, when a load is applied to the hand guard 20 in a state where the hand guard 20 is in contact with an obstacle, the hand guard 20 deforms from a closed state to an open state. Further, in yet another embodiment, the hand guard 20 may be configured capable of sliding between a first position and a second position with respect to the housing 4. In this case, when a load is applied to the hand guard 20 in a state where the hand guard 20 is in contact with an obstacle, the hand guard 20 slides between the first and second positions, by which the position of the hand guard 20 with respect to the housing 4 changes. In cases where the hand guard 20 is configured to deform using a method other than the elastic deformation, the hand guard 20 may be constituted of a material other than rubber (such as plastic, polyamide in particular), and a material with Young's modulus of 100 MPa or more may be used.

In the above embodiments, the chainsaw T (an example of the cutter machine) may not comprise the transmission mechanism 70. In this case, for example, a plurality of teeth may be arranged on the sprocket 26, and these teeth of the sprocket 26 may mesh with the first bevel gear **72*a* fixed to the motor shaft 80. Further, the worm wheel 68*a* of the oil pump 68 may mesh with the first bevel gear 72*a* fixed to the motor shaft 80**.

In the above embodiments, the configurations in which metal such as aluminum is used for the controller case 620 have been explained. In another embodiment, the controller case 620 may be constituted of metal that is other than aluminum (such as iron). Further, in yet another embodiment, the controller case 620 may be constituted of a material other than metal (such as plastic, polyamide in particular).

Figure 15:
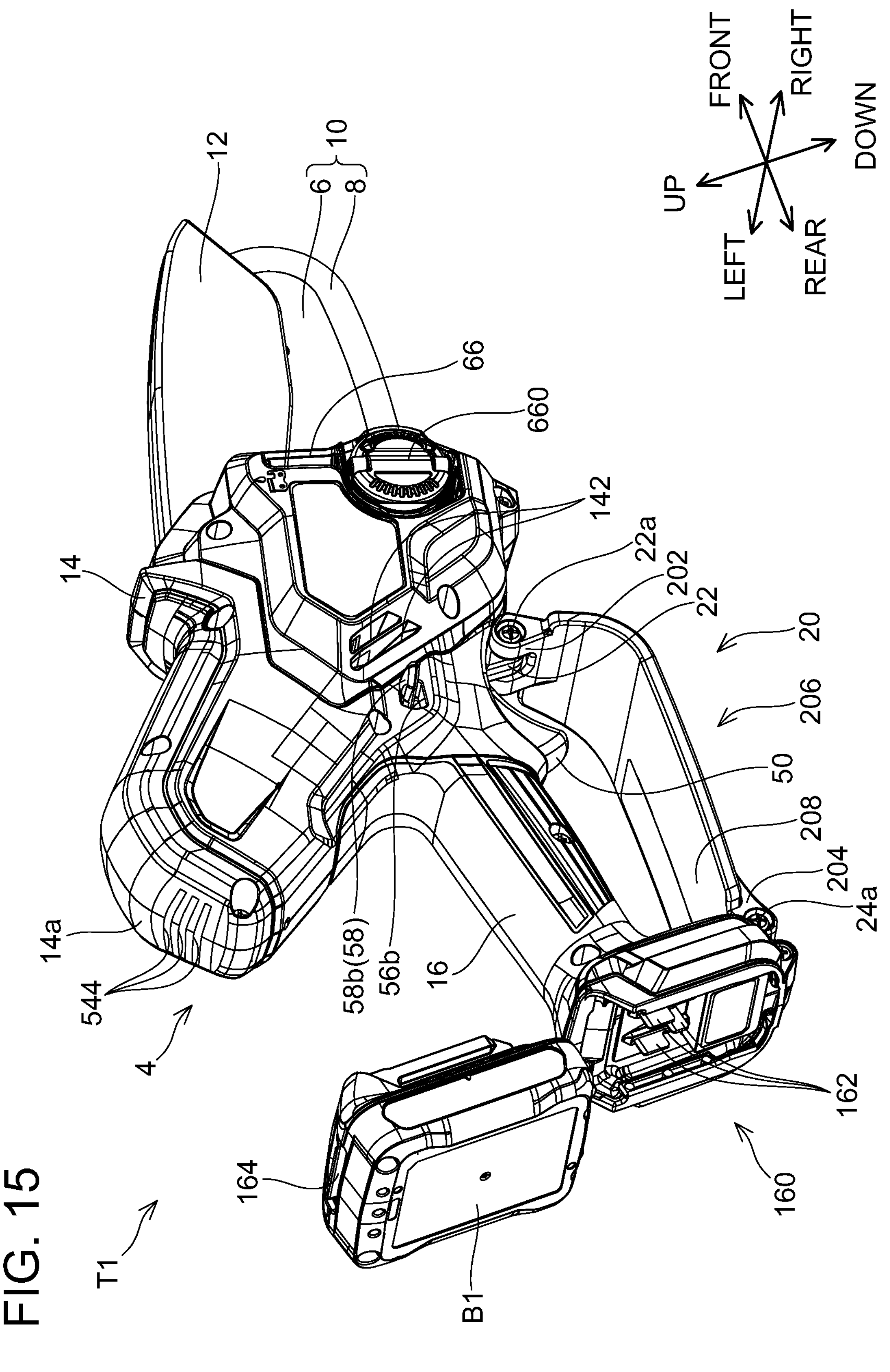
FIG. 15 is a perspective view seeing a chainsaw T1 of a variant from the rear right upper side in a state of having a battery pack B1 detached from a battery interface 160.

As shown in FIG. 15, the chainsaw T1 (an example of the cutter machine) may comprise an air outlet 544 instead of the air outlets 144, 146 in the above embodiments. The air outlet 544 is disposed at the top portion **14*a* of the housing body 14. In this case, when the cooling fan 82 rotates, the air within the housing 4 is discharged to the outside through the air outlet 544 instead of the air outlets 144, 146. In this case as well, the cooling fan 82 can cool the electric motor 64 as the electric motor 64 is driven. The above configuration may be applied to any of chainsaws T2, T3, and T4**.

(Correspondence Relationship)

As described above, in one or more embodiments, the chainsaw T (an example of the cutter machine) comprises the working unit 10 (an example of the cutter unit), the electric motor 64 (an example of the prime mover) configured to drive the working unit 10, the housing 4 including the housing body 14 and the grip 16, wherein the housing body 14 holds the working unit 10 and houses the electric motor 64, and the grip 16 extends from the housing body 14 and is configured to be grasped by a user's hand, and the hand guard 20 attached to the housing 4, configured to protect fingers of the user's hand grasping the grip 16, and being more deformable than the housing 4.

According to the above configuration, when a load is applied to the hand guard 20 in a state where the hand guard 20 is in contact with an obstacle, the hand guard 20 deforms relative to the housing 4. Due to this, when the user is to perform the cutting work using the chainsaw T, the chainsaw T can be used in its desired position or posture even if the hand guard interferes with an obstacle. Thus, user convenience can be improved in the chainsaw T with the hand guard 20.

In one or more embodiments, the housing 4 is constituted of the material with Young's modulus greater than 100 MPa. The hand guard 20 is constituted of the material with a Young's modulus within the range from 1 MPa to 100 MPa.

When the hand guard 20 is to be deformed by elastic deformation, a load required to deform the hand guard 20 by a predetermined amount becomes larger when the Young's modulus of the material constituting the hand guard 20 becomes greater. According to the above configuration, a user can sufficiently deform the hand guard 20 with a relatively small load. Due to this, user convenience can further be improved.

In one or more embodiments, the housing 4 is constituted of plastic. The hand guard 20 is constituted of rubber.

Rubber can be elastically deformed at a greater degree as compared to other materials (such as plastic). According to the above configuration, the user can elastically deform the hand guard 20 at a greater degree. Due to this, the user convenience can further be improved.

In one or more embodiments, the hand guard 20 comprises the first end 202 disposed in proximity to the base end of the grip 16, the second end 204 disposed in proximity to the distal end of the grip 16, and the guard body 206 extending continuously between the first end 202 and the second end 204.

According to the above configuration, the hand guard 20 is disposed to cover the grip 16 from its base end to the distal end. Due to this, the fingers of the user's hand grasping the grip 16 can surely be protected.

In one or more embodiments, the housing 4 further comprises the first attachment portion 22 to which the first end 202 of the hand guard 20 is attached, and the second attachment portion 24 to which the second end 204 of the hand guard 20 is attached. At least one of the first end 202 and the second end 204 is rotatably attached to corresponding one of the first attachment portion 22 and the second attachment portion 24.

When the hand guard 20 is supported at two points, namely at the first end 202 and the second end 204, there may be cases where each of the first end 202 and the second end 204 is fixed to its corresponding one of the first attachment portion 22 and the second attachment portion 24. In this case, the hand guard 20 can be regarded as being a fixed beam, thus the load required for deforming the hand guard 20 (guard body 206) by a predetermined amount becomes larger. Contrary to this, according to the above configuration, at least one of the first end 202 and the second end 204 is rotatably attached to its corresponding one of the first attachment portion 22 and the second attachment portion 24. In this case, the hand guard 20 can be regarded as being a supported cantilever or a simply supported beam (pin-supported), thus the user can sufficiently deform the hand guard 20 with a relatively small load.

In one or more embodiments, the guard body 206 comprises the plate portion 208 having a plate shape.

According to the above configuration, by configuring the plate portion 208 to be in the plate shape that spreads with a small thickness, the plate portion 208 can easily be deformed elastically and the fingers of the user's hand can be protected by the plate portion 208 over a wide range. Due to this, the hand guard 20 that can easily deform while ensuring the protecting function as the hand guard 20 can be realized.

In one or more embodiments, the guard body 206 comprises the first rib portions 212 (an example of the rib portion) protruding from the surface of the plate portion 208 and extending in the direction from the first end 202 toward the second end 204, at the part where the guard body 206 is opposed to the grip 16.

When the plate portion 208 deforms excessively (a warping amount of the plate portion 208 becoming excessively large) at the part where the guard body 206 is opposed to the grip 16, an interval between the grip 16 and the plate portion 208 becomes extremely narrow, and the plate portion 208 might be pressed against the fingers of the user's hand grasping the grip 16. In this case, the user cannot easily change postures of the fingers, thus the user convenience is decreased. According to the above configuration, rigidity of the plate portion 208 at the part where the guard body 206 is opposed to the grip 16, is reinforced by the first rib portions 212. Due to this, the plate portion 208 can be suppressed from deforming excessively (the warping amount of the plate portion 208 becoming excessively large) at the part where the guard body 206 is opposed to the grip 16. Due to this, the plate portion 208 can be suppressed from being pressed against the fingers of the user's hand grasping the grip 16. Thus, the user convenience can be improved.

In one or more embodiments, the first rib portions 212 protrude from the lower surface of the plate portion 208 (example of a surface of the plate portion that is opposite a surface of the plate portion facing the grip).

When the first rib portions 212 protrude from the upper surface of the plate portion 208 (an example of the surface of the plate portion facing the grip), there is a risk that the first rib portions 212 come into contact with the fingers of the user's hand upon when the user inserts the fingers between the grip 16 and the plate portion 208 or takes them out. In such a case, the user may feel bothered by the contact, and the user convenience may thereby be decreased. Contrary to this, according to the above configuration, the first rib portions 212 protrude out from the lower surface of the plate portion 208. Due to this, the first rib portions 212 can be suppressed from coming into contact with the fingers of the user's hand when the user inserts the fingers between the grip 16 and the plate portion 208 or takes them out. Thus, the user convenience can be improved.

In one or more embodiments, the chainsaw T further comprises the trigger lever 50 disposed in proximity to the base end of the grip 16 and configured to operate the electric motor 64 by being pulled toward the grip 16 by a user's finger. The guard body 206 comprises the first extending portion 220 connected to the first end 202 and extending to separate away from the grip 16 as it extends from the base end toward the distal end, the second extending portion 222 connected to the second end 204 and extending to separate away from the grip 16 as it extends from the distal end toward the base end, and the bending portion 224 connecting the first extending portion 220 and the second extending portion 222. A length of the first extending portion 220 is shorter than a length of the second extending portion 222.

If the guard body 206 is pressed against the finger(s) of the user's hand that are placed on the trigger lever 50 upon when the guard body 206 deforms, the trigger lever 50 could be operated erroneously. Contrary to this, according to the above configuration, the guard body 206 has reinforced rigidity at and around the bending portion 224. Further, the bending portion 224 has a shape protruding outward as seen from the grip 16. Due to this, when the guard body 206 is pressed against the grip 16, a space is secured between the grip 16 and the guard body 206 by the bending portion 224. Further, since the bending portion 224 is disposed closer to the base end of the grip 16, a space is secured in the surrounding of the trigger lever 50 upon when the guard body 206 is pressed against the grip 16. As such, according to the above configuration, the guard body 206 can be suppressed from being pressed against the finger(s) of the user's hand that are placed on the trigger lever 50, and erroneous operation on the trigger lever 50 can be suppressed.

What is claimed is:

1. A cutter machine, comprising:

a cutter unit;

a prime mover configured to drive the cutter unit;

a housing including a housing body and a grip, wherein the housing body holds the cutter unit and houses the prime mover, and the grip extends from the housing body and is configured to be grasped by a user's hand; and a hand guard attached to the housing, configured to protect fingers of the user's hand grasping the grip, and being more deformable than the housing, wherein the housing is constituted of a material with a Young's modulus greater than 100 MPa, and the hand guard is constituted of a material with a Young's modulus within a range from 1 MPa to 100 MPa.

2. The cutter machine according to claim 1, wherein the housing is constituted of plastic, and the hand guard is constituted of rubber.

3. A cutter machine, comprising:

a cutter unit;

a prime mover configured to drive the cutter unit;

a housing including a housing body and a grip, wherein the housing body holds the cutter unit and houses the prime mover, and the grip extends from the housing body and is configured to be grasped by a user's hand; and a hand guard attached to the housing, configured to protect fingers of the user's hand grasping the grip, and being more deformable than the housing, wherein the hand guard comprises:

a first end disposed at or in proximity to a base end of the grip;

a second end disposed at or in proximity to a distal end of the grip; and a guard body extending continuously between the first end and the second end.

4. The cutter machine according to claim 3, wherein the housing comprises:

a first attachment portion to which the first end of the hand guard is attached; and a second attachment portion to which the second end of the hand guard is attached, and at least one of the first end and the second end is rotatably attached to corresponding one of the first attachment portion and the second attachment portion.

5. The cutter machine according to claim 3, wherein the guard body comprises a plate portion having a plate shape.

6. The cutter machine according to claim 5, wherein the guard body comprises a rib portion protruding from a surface of the plate portion and extending in a direction from the first end toward the second end, at a part where the guard body is opposed to the grip.

7. The cutter machine according to claim 6, wherein the rib portion protrudes from a surface of the plate portion that is opposite a surface of the plate portion facing the grip.

8. The cutter machine according to claim 3, further comprising:

a trigger lever disposed at or in proximity to the base end of the grip and configured to operate the prime mover by being pulled toward the grip by a user's finger, wherein the guard body comprises:

a first extending portion connected to the first end and extending to separate away from the grip as it extends from the base end toward the distal end;

a second extending portion connected to the second end and extending to separate away from the grip as it extends from the distal end toward the base end; and a bending portion connecting the first extending portion and the second extending portion, and a length of the first extending portion is shorter than a length of the second extending portion.

9. The cutter machine according to claim 1, wherein the housing is constituted of plastic, the hand guard is constituted of rubber, the hand guard comprises:

a first end disposed at or in proximity to a base end of the grip;

a second end disposed at or in proximity to a distal end of the grip; and a guard body extending continuously between the first end and the second end, the housing comprises:

a first attachment portion to which the first end of the hand guard is attached; and a second attachment portion to which the second end of the hand guard is attached, at least one of the first end and the second end is rotatably attached to corresponding one of the first attachment portion and the second attachment portion, the guard body comprises a plate portion having a plate shape, the guard body comprises a rib portion protruding from a surface of the plate portion and extending in a direction from the first end toward the second end, at a part where the guard body is opposed to the grip, the rib portion protrudes from a surface of the plate portion that is opposite a surface of the plate portion facing the grip, the cutter machine further comprises a trigger lever disposed at or in proximity to the base end of the grip and configured to operate the prime mover by being pulled toward the grip by a user's finger, the guard body comprises:

a first extending portion connected to the first end and extending to separate away from the grip as it extends from the base end toward the distal end;

a second extending portion connected to the second end and extending to separate away from the grip as it extends from the distal end toward the base end; and a bending portion connecting the first extending portion and the second extending portion, and a length of the first extending portion is shorter than a length of the second extending portion.

* * * * *